US012699941B1

(12) United States Patent
Saini et al.

(10) Patent No.:   US 12,699,941 B1
(45) Date of Patent:        Aug. 4, 2026

(54) SYSTEM AND METHOD OF MANAGING WORKFLOW FOR AN OBSERVED EVENT

(71) Applicant: Task Watch Corporation, Mason, OH (US)

(72) Inventors: Bharat A. Saini, Mason, OH (US); Vivek B. Saini, Ridgewood, NY (US)

(73) Assignee: Task Watch Corporation, Mason, OH (US)

( * ) Notice: Subject to any disclaimer, the term of this patent is extended or adjusted under 35 U.S.C. 154(b) by 53 days.

(21) Appl. No.: 18/619,980

(22) Filed: Mar. 28, 2024

Related U.S. Application Data

(63) Continuation-in-part of application No. 18/535,831, filed on Dec. 11, 2023, which is a continuation-in-part of application No. 17/682,269, filed on Feb. 28, 2022, now Pat. No. 11,880,795, which is a continuation of application No. 17/564,959, filed on Dec. 29, 2021, now abandoned.

(51) Int. Cl.
  *G06Q 10/0633*        (2023.01)
  *G06Q 10/0631*        (2023.01)
  *G06V 20/52*        (2022.01)

(52) U.S. Cl.
  CPC .  *G06Q 10/0633* (2013.01); *G06Q 10/063112* (2013.01); *G06V 20/52* (2022.01)

(58) Field of Classification Search
  CPC .... G06F 3/005; G08B 13/19613; G06V 20/52
  See application file for complete search history.

(56) References Cited

U.S. PATENT DOCUMENTS

| | | | |
|---|---|---|---|
| 8,938,222 B2 | 1/2015 | Morohoshi | |
| 9,779,375 B2 | 10/2017 | Grabovski | |
| 10,108,783 B2 | 10/2018 | Horseman | |
| 10,229,402 B2 | 3/2019 | Leggo | |
| 10,970,659 B1 | 4/2021 | Saimi | |
| 11,238,380 B1 | 2/2022 | Perry | |
| 11,357,131 B1 | 6/2022 | Enright | |
| 11,468,681 B1 * | 10/2022 | Kumar | G06V 40/10 |
| 11,619,524 B2 | 4/2023 | Moore | |
| 2003/0139955 A1 | 7/2003 | Karli | |
| 2003/0204431 A1 | 10/2003 | Ingman | |
| 2006/0224797 A1 | 10/2006 | Parish | |
| 2007/0018831 A1 | 1/2007 | Shanton | |
| 2008/0033780 A1 | 2/2008 | Lee | |
| 2008/0177646 A1 | 7/2008 | Bentley | |

(Continued)

FOREIGN PATENT DOCUMENTS

JP        2018063588 A  *  4/2018

OTHER PUBLICATIONS

Yuanjun Xiong, Kai Zhu, Dahua Lin and X. Tang, "Recognize complex events from static images by fusing deep channels," 2015 IEEE Conference on Computer Vision and Pattern Recognition (CVPR), Boston, MA, USA, 2015, pp. 1600-1609, (Year: 2015).*

*Primary Examiner* — Jerry O'Connor
*Assistant Examiner* — Ayanna Minor
(74) *Attorney, Agent, or Firm* — Mark F. Smith; Smith Brandenburg Ltd.

(57)        ABSTRACT
A system and method that monitors at a location and detects events in images taken by image capture apparatus and determines if there is a recognized event and monitors movement of the event through the location and assigns a concern level and a workflow for responding to the recognized event.

18 Claims, 15 Drawing Sheets

(56)                    References Cited

U.S. PATENT DOCUMENTS

| | | | |
|---|---|---|---|
| 2009/0037241 A1 | 2/2009 | Olsen | |
| 2009/0083100 A1 | 3/2009 | Darby | |
| 2009/0087096 A1* | 4/2009 | Eaton | G06V 10/28 |
| | | | 382/190 |
| 2009/0174550 A1 | 7/2009 | Aninye | |
| 2009/0284348 A1 | 11/2009 | Pfeffer | |
| 2010/0036667 A1 | 2/2010 | Byford | |
| 2010/0131077 A1 | 5/2010 | Brown | |
| 2011/0117878 A1 | 5/2011 | Barash | |
| 2011/0202351 A1 | 8/2011 | Plecher | |
| 2014/0002241 A1 | 1/2014 | Elghazzawi | |
| 2014/0136255 A1 | 5/2014 | Grabovski | |
| 2014/0195257 A1 | 7/2014 | Perkins | |
| 2014/0278627 A1 | 9/2014 | Grabovski | |
| 2014/0337074 A1 | 11/2014 | Taylor | |
| 2015/0066557 A1 | 3/2015 | Lichti | |
| 2015/0102926 A1 | 4/2015 | Kamalakannan | |
| 2015/0161876 A1 | 6/2015 | Castillo | |
| 2015/0302340 A1 | 10/2015 | Dasgupta | |
| 2015/0317582 A1 | 11/2015 | Nath | |
| 2016/0084986 A1 | 3/2016 | Zach | |
| 2017/0067200 A1 | 3/2017 | Patel | |
| 2017/0185984 A1 | 6/2017 | Leggo | |
| 2018/0182475 A1* | 6/2018 | Cossler | G16H 50/50 |
| 2018/0341806 A1* | 11/2018 | Chavez | G06V 10/94 |
| 2019/0243333 A1 | 8/2019 | Yoon | |
| 2019/0278976 A1* | 9/2019 | Khadloya | G08B 13/19656 |
| 2019/0341147 A1 | 11/2019 | Lord | |
| 2020/0097724 A1* | 3/2020 | Chakravarty | G06V 10/454 |
| 2020/0202472 A1 | 6/2020 | Barak | |
| 2021/0397848 A1* | 12/2021 | Lee | G06V 20/52 |
| 2022/0341786 A1 | 10/2022 | Yamaguchi | |
| 2022/0409078 A1 | 12/2022 | Sperrhake | |
| 2023/0351562 A1 | 11/2023 | Zhao | |
| 2023/0363328 A1 | 11/2023 | Lys | |
| 2023/0367283 A1 | 11/2023 | Shimoyama | |
| 2023/0370327 A1 | 11/2023 | Heo | |

* cited by examiner

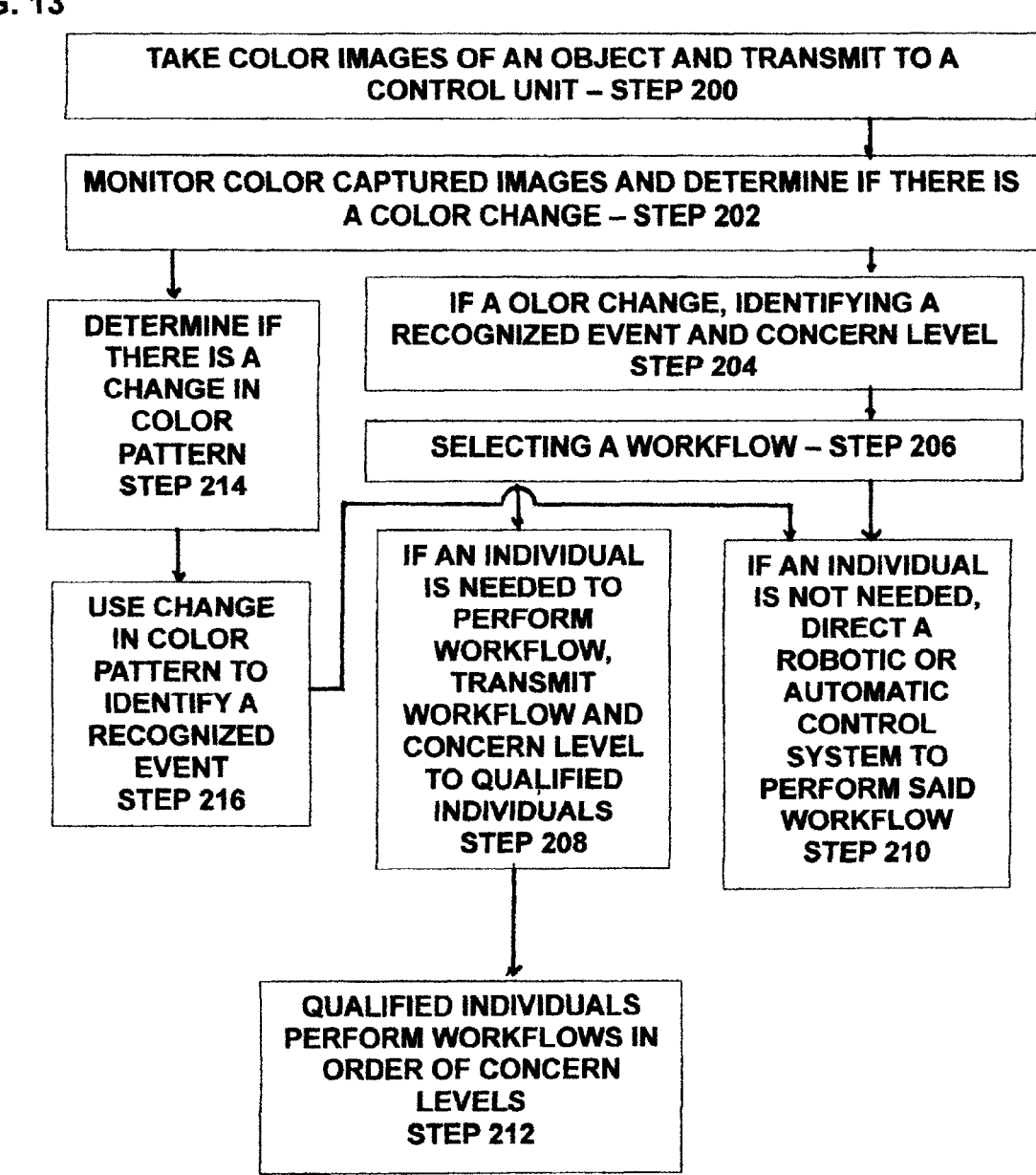

TAKE COLOR IMAGES OF AN OBJECT AND TRANSMIT TO A
CONTROL UNIT – STEP 200

MONITOR COLOR CAPTURED IMAGES AND DETERMINE IF THERE IS
A COLOR CHANGE – STEP 202

DETERMINE IF
THERE IS A
CHANGE IN
COLOR
PATTERN
STEP 214

IF A OLOR CHANGE, IDENTIFYING A
RECOGNIZED EVENT AND CONCERN LEVEL
STEP 204

SELECTING A WORKFLOW – STEP 206

USE CHANGE
IN COLOR
PATTERN TO
IDENTIFY A
RECOGNIZED
EVENT
STEP 216

IF AN INDIVIDUAL
IS NEEDED TO
PERFORM
WORKFLOW,
TRANSMIT
WORKFLOW AND
CONCERN LEVEL
TO QUALIFIED
INDIVIDUALS
STEP 208

IF AN INDIVIDUAL
IS NOT NEEDED,
DIRECT A
ROBOTIC OR
AUTOMATIC
CONTROL
SYSTEM TO
PERFORM SAID
WORKFLOW
STEP 210

QUALIFIED INDIVIDUALS
PERFORM WORKFLOWS IN
ORDER OF CONCERN
LEVELS
STEP 212

SYSTEM AND METHOD OF MANAGING WORKFLOW FOR AN OBSERVED EVENT

BACKGROUND OF THE INVENTION

This application is a continuation-in-part and claims benefit to, in its entirety, U.S. patent application Ser. No. 18/535,831 filed on Dec. 11, 2023 which is a continuation-in-part of and claims benefit to, in its entirety, U.S. Pat. No. 11,880,795 issued Jan. 23, 2024, which is a continuation of and claims benefit to, in its entirety, to U.S. patent application Ser. No. 17/564,959 filed on Dec. 29, 2021 and now abandoned.

The present invention relates to computer-aided interactive system that provides a computer-aided interactive method and system whereby images, such as streaming images, are analyzed and when an event is detected and allows an event to be followed if it moves through a location. The system operates to detect one or more events and determine if action, such as a workflow (task) is needed and if an individual or a mechanical device or automatic system is needed to perform any workflow based on the identified event.

Many businesses today, particularly large businesses, have a multitude of individuals that operate on the premises and large building centers and are responsible for performing various tasks. One problem with such businesses (such as hospitals, stores, warehouses, manufacturing plants, and other similar places) is that it is difficult for them to monitor and take timely action on observed events that may be taking place at various locations on the property. This is particularly problematic in areas on the property where there is few or any individuals at that location. Further, individuals are often not at their work site or location, such as when the individual decides to have lunch or take a break. Accordingly, events may take place at that location which are not observed and which can result in the creation of dangerous conditions or lost business opportunities. Further, some events migrate or move through a location and it is difficult to determine if an event identified at one area of a location migrates or moves to another area is the same identified event. While systems and methods have been developed that record information and conditions at a location, such as the installation of cameras that take images at a location or warning systems that detect potential environmental concerns, such as smoke detectors, heat detectors, gas detectors, and the like. Such systems either only record conditions, such as generating data for after-the-fact analysis or images taken by a camera, or detect that a concern exist, but do not mitigate risks at the time the events are detected at that location or assign workflows (tasks) to individuals based on a detected event or operate to detect and identify events based on images taken at a location. Further, such systems do not operate to detect certain events, such as an individual that may have fallen or that something may have spilled causing a potentially hazardous condition. In addition, if a dangerous condition is detected, it often takes time for management to identify the problem and assign the proper individual to take action. Such a time delay could result in a problem growing in size and danger. Further, current systems and methods do not operate to detect and identify events from one or more images and determines one or more concern values based on the sequence of the detected events or time periods between such detected events. In addition, events identified at one location, such as by use of an image taken by one image capture apparatus, may not be a concern unless the event is detected and identified using images captured by other image capture apparatus.

Many systems have been developed that use color sensors and other types of sensing devices that operate to detect color changes that the sensor or device have been configured to detect. However, until now, a system has not been developed that uses a baseline color or color pattern and compares changes in color or a color pattern to determine what that particular color change or color pattern change may indicate and select a response for that particular color change or color pattern change. Accordingly, unlike previous designed systems, the system and method of the subject invention allows specific responses for various color changes or color pattern changes.

Many systems have also been developed having image capture apparatus that take images of objects and persons, such as cameras, that are strategically positioned within an area of a location. While individuals monitoring such objects and persons can detect movement using such image capture apparatus and can recognize that the same object or person in an image taken by one image capture apparatus is the same object or person in an image taken by another image capture apparatus capturing images of an object or person within another area, it is difficult for an automated system to identify that an image of an object or person taken from one image capture apparatus is the same object or person shown in the image taken by another image capture apparatus.

Accordingly, what is needed is a system and method whereby images at various areas within a location are continuously monitored and when an event of interest is detected, the system operates to determine if it is an actionable event (requiring a workflow) and if so, the system automatically identifies the type of the event, determines if the event requires a workflow and if the workflow requires an individual or a mechanical or robotic system to perform the workflow conducts a response to perform the workflow. A system and method are also needed whereby images of objects and persons (hereinafter referred to as "objects") moving through a location can be tracked across separate image capture apparatus capturing images of various areas within the locations and as an object (event) is detected in images captured by different image capture apparatus, the system can identify the object (event) as being the same object (event) or is a different object (event) as taken in another image captured by another image capture apparatus.

SUMMARY OF THE INVENTION

A preferred embodiment of the subject invention is a system and method of the subject invention identifies observed events and assigns and manages workflows for such observed events. Preferably, the system includes one or more image capture apparatus, such as a camera, that takes images at a location and transmits the images to a control unit having analysis software that monitors the images and if an event is detected it determines if the event is a recognized event. If the event is a recognized a concern level is assigned to the recognized event and if the concern value is above a certain level, the analysis software directs the control unit to utilize response software that operates to identify one or more individuals qualified to respond to a recognized event and preferably transmits a notification to the one or more individuals that a response to the recognized event must be performed.

In a preferred embodiment of the invention, the analysis software further identifies an event and monitors the concern level of the event.

In a preferred embodiment of the invention, if an event is not a recognized event, the analysis software transmits a notice to an administrator that a non-recognized event has been detected.

In a preferred embodiment of the invention, if the event is not a recognized event, the analysis software transmits a notice and one or more of the images to an administrator.

In a preferred embodiment of the invention, if the event is not a recognized event, the analysis software transmits a notice and one or more of the images to an administrator and whereby the administrator assigns a concern level to a non-recognized event whereby the response software identifies one or more individuals qualified to respond to the event and transmits a task notification (a workflow) to the one or more individuals that a response to the non-recognized event must be performed.

In a preferred embodiment of the invention, the analysis software detects and identifies a plurality of recognized events in a sequence of images or video stream and determines a concern level based on the sequence of the recognized events.

In a preferred embodiment of the invention, the analysis software detects and identifies a plurality of recognized events in a sequence of images or video stream and determines a concern level based on a time period between the recognized events.

In a preferred embodiment of the invention, if a recognized event has been detected and if the concern level is of a specific level, an alarm notice is transmitted to one or more administrative agencies.

In a preferred embodiment of the invention, if the concern level is of a specific level, the response software uses the event to identify the one or more administrative agencies and an alarm notice is transmitted to the identified one or more administrative agencies.

In a preferred embodiment of the invention, the one or more image capture apparatus includes or cooperates with one or more condition sensors that monitor conditions at the location.

In a preferred embodiment of the invention, the analysis software uses the conditions at a location to identify a concern value for the event.

In a preferred embodiment of the invention, if the concern level is of a specific level, the response software identifies one or more administrative agencies that an alarm notice based on the event and the concern level.

In a preferred embodiment of the invention, the workflow provides modifications to the programming of a robotic or an automatic control system.

A preferred embodiment of the system for managing workflows for observed events comprises one or more image capture apparatus that takes color images of an object and transmits color captured images to a control unit, wherein the control unit having analysis software monitors the color captured images to determine if there is a change in color between a color captured image from a previous color captured image; wherein if the analysis software determines that there is a color change, the analysis software identifies a recognized event based on the color change and determines a concern value for the recognized event, wherein the analysis software then directs response software to determine a workflow for responding to the recognized event; wherein the response software further determines if an individual is needed to perform the workflow, wherein if it is determined that an individual is needed to perform the workflow, the response software selects one or more qualified individuals who are qualified to perform the workflow and transmits the workflow and the concern level to individuals input/output device of each selected one or more qualified individuals, wherein if the response software determines that an individual is not needed to perform the workflow, the response software interacts with one or more automated control systems controlling robotic or automatic equipment or machines to perform the workflow.

In a preferred embodiment, wherein if the response software determines if an individual is needed to perform the workflow, and the one or more qualified individuals are performing other workflows having concern levels, the one or more qualified individuals perform the workflows in order of the concern levels (highest concern levels are performed before a lower concern level).

In a preferred embodiment, the analysis software examines color pixels and RGB values (color values) creating the color captured images and detects any changes in the pixels and RGB values occurring between the color captured image to a previously color captured image to identify the recognized event.

In a preferred embodiment, the analysis software examines color pixels and RGB values (color values) creating the color captured images and calculates an average RGB value for each color captured images and uses the average RGB values to detect any changes in the average RGB values to determine if there is a change in color between the color captured images, the analysis software then uses the change in color to identify a recognized event, and wherein the analysis software compares the change in the average RGB values with RGB reference thresholds for the recognized event and if the change in the average RGB values are below the RGB reference thresholds, the analysis software continues to monitor the color captured images, and wherein if the change in the average RGB values is equal to or above the RGB reference thresholds, the analysis software determines a concern value and directs the response software to determine a workflow for responding to the recognized event.

In a preferred embodiment, the workflow is further selected based on degree or color change (the amount of color change, such as the change in the RGB values).

In a preferred embodiment, the analysis software identifies changes in color patterns between the color captured image and the previously color captured image and further uses the change in the color patterns to identify the registered event.

In a preferred embodiment, the analysis software determines a time period between the color captured image and the previous color captured image, and wherein the analysis software uses the recognized event and the time period to determine the concern level.

A preferred embodiment of the invention is a system for managing workflows for observed events comprises one or more image capture apparatus that take color images of an event and transmits color captured images to a control unit, wherein the control unit having analysis software that monitors the color captured images and detects any changes in pixels and RGB values and/or color patterns of the color captured images and determines if there is a change in color from a color captured image from a previous color captured image, and if the analysis software determines that there is a color change, the analysis software identifies the event as a recognized event and determines a concern value for the recognized event, and the analysis software then directs response software to determine a workflow for responding to the recognized event; wherein the response software determines if an individual is needed to perform the workflow and if it is determined that an individual is needed to perform the workflow, the response software selects one or more qualified individuals who are qualified to perform the workflow and transmits the workflow and the concern level to individuals input/output device of each selected the one or more qualified individuals, and wherein if the response software determines that an individual is not needed to perform the workflow, the response software interacts with one or more automated control systems controlling robotic or automatic equipment or machines to perform the workflow; and wherein if the software determines if an individual is needed to perform the workflow, and wherein if the one or more qualified individuals are performing other workflows having concern levels, the one or more qualified individuals perform the workflows in order of the concern levels.

In a preferred embodiment of the invention, the recognized event is selected from a list of recognized events that correspond to the color change.

In a preferred embodiment of the invention, the workflow is selected from a listing of workflows for the recognized event.

In another preferred embodiment, the analysis software calculates surface area where changes in color occurs and uses the surface area to determine a concern level.

The method for managing workflows for observed events comprises the steps of: taking color images of an event and transmitting the color captured images to a control unit; monitoring the color captured images to determine if there is a change in color from a color captured image and a previous color captured image using changes in the pixels and their RGB values between the color captured image and the previous color captured image; if there is a color change between said color captured image and the previous color captured image, determining if the event is a recognized event and determining a concern value for the recognized event; selecting a workflow for responding to the recognized event; determining if an individual is needed to perform the workflow and if it is determined that an individual is needed to perform the workflow; selecting one or more qualified individuals who are qualified to perform the workflow and transmitting the workflow and the concern level to individuals input/output device of each selected one or more qualified individuals, and wherein if it is determined that an individual is not needed to perform the workflow, interacting with one or more automated control systems controlling robotic or automatic equipment or machines to perform the workflow; and if is determined that an individual is needed to perform the workflow, and wherein if one or more qualified individuals are performing other workflows having concern levels, the one or more qualified individuals perform the workflows in order of the concern levels.

A preferred embodiment of the invention is a system for managing workflows for observed events comprises an image capture apparatus that takes one or more images of an event and transmits the captured images to a control unit, wherein the control unit has analysis software that monitors the images and if an event is detected it determines if the event is a recognized event (for example detects an object in an image) and then calculates movement information of the recognized event (object) using the captured images and assigns an identification tag to the recognized event, wherein using the calculated movement information the analysis software determines a time period that the recognized event should appear in one or more captured images taken by another image capture apparatus and if the recognized event appears in one or more captured images taken by the another image capture apparatus, the analysis software assigns the same identification tag to the recognized event appearing in the image(s) taken by the another image captured apparatus thereby allowing the same recognized event to be tracked as it moves in view from one image capture apparatus into view of another image captured apparatus.

In a preferred embodiment of the invention the captured images are color images.

In a preferred embodiment of the invention movement information includes the direction of movement of the recognized event.

In a preferred embodiment of the invention movement information includes the rate (speed) of movement of the recognized event.

In a preferred embodiment of the invention movement information includes the time period (the amount of time that the recognized event is shown in a captured image taken by and a recognized event is shown in a captured image taken by one image capture apparatus and a recognized event is shown in a captured image taken by another image captured apparatus) between a recognized event shown in an image taken by a first image capture apparatus and a recognized event shown in an image taken by a second image capture apparatus.

In a preferred embodiment of the invention, the analysis software compares the attributes of a first recognized event and the attributes of a second recognized event to determine if the first recognized event and the second recognized event are the same recognized event or are different recognized events, and if the recognized events are the same, the analysis software determines if the concern level for the recognized event should be increased or decreased based on the changes in the attributes.

These and other benefits, advantages, and embodiments of the invention will be apparent from the following description, the accompanying drawings and the appended claims.

BRIEF DESCRIPTION OF THE DRAWINGS

Features, aspects, and advantages of the present invention will become better understood with regard to the following description, appended claims, and accompanying drawings where:

FIG. 7 is a schematic illustration showing an event being detected by the analysis software and if the event is not a recognized event, the analysis software operates to transmit a notice and an image showing the event to the administrator and the administrator deciding to add the event to the list of recognized events and giving the new recognized event a concern level and adding a workflow for the newly added recognized event to the listing of workflows and identifying qualified individuals on the listing of qualified individuals for responding to the newly added recognized event and further showing the response software operating and using the list of recognized events, listing of workflows and listing of qualified individuals to send a workflow including one or more images showing the newly recognized event to the input/output devices of the identified qualified individuals;

FIG. 13 is a flow diagram showing a method of managing workflows for an observed event;

DETAILED DESCRIPTION OF THE INVENTION

Figure 1:
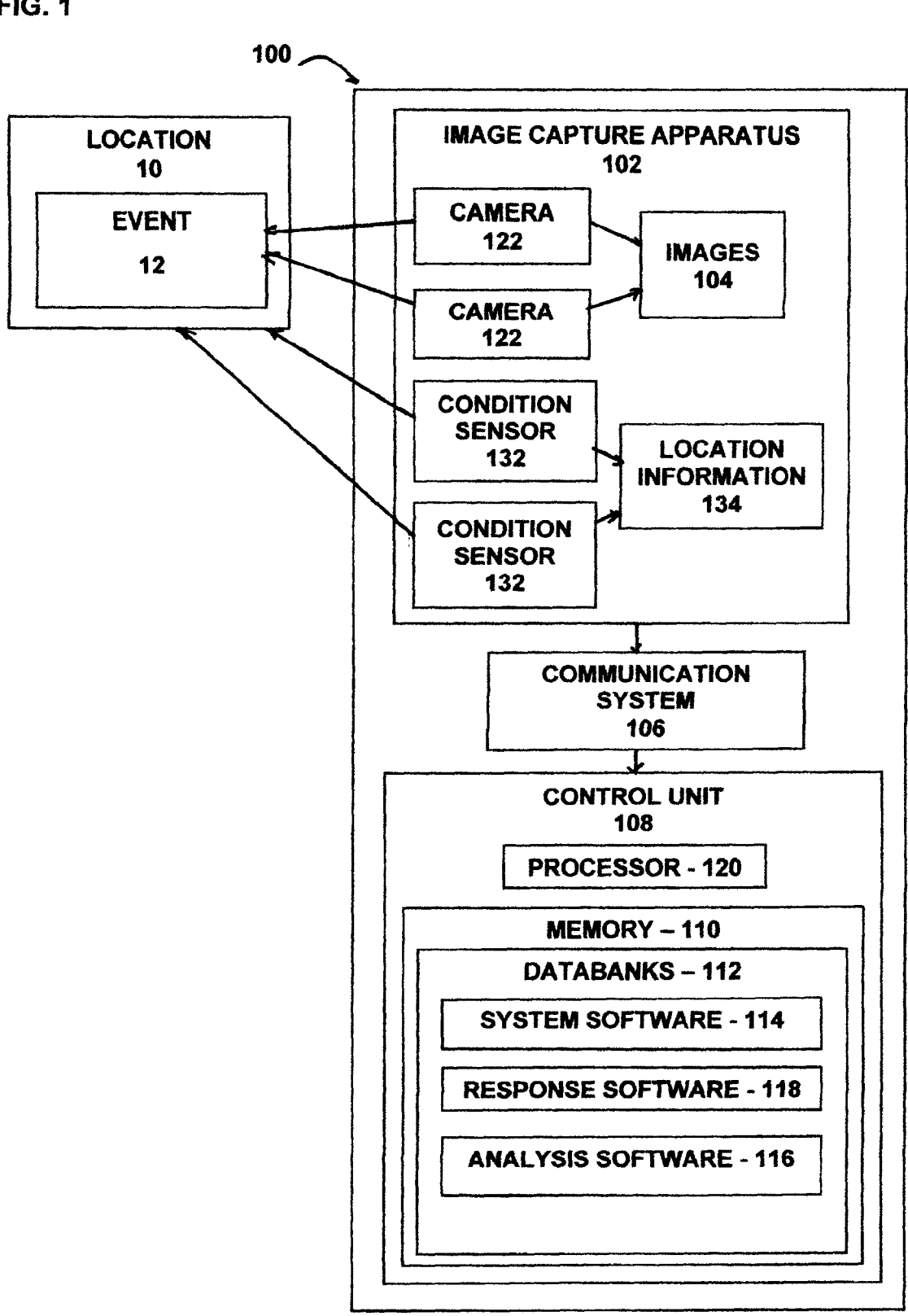
FIG. 1 is a schematic representation of a system and method for managing workflows (tasks) for identified (observed) events showing at least one image capture apparatus for obtaining images at a location and transmitting the at least one image to a control unit having a memory with one or more databanks and having a processor for operating system software, analysis software and response software.

The subject invention is a system and method of the subject invention is for managing workflow for observed events. Preferably, the system includes one or more image capture apparatus, such as a camera, that takes images at a location and transmits the images to a control unit having analysis software that operates to monitor the images. If an event is detected it operates to determine if the event (or events) is a recognized event and if an event is a recognized event the analysis software operates to determine a concern value for the event and if the concern value level is of a certain value it directs the control unit to utilize reaction software that operates to identify one or more individuals qualified to respond to the recognized event and transmits a notification to the one or more individuals that a response to the recognized event must be performed.

In describing the preferred embodiments of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose.

Figure 2:
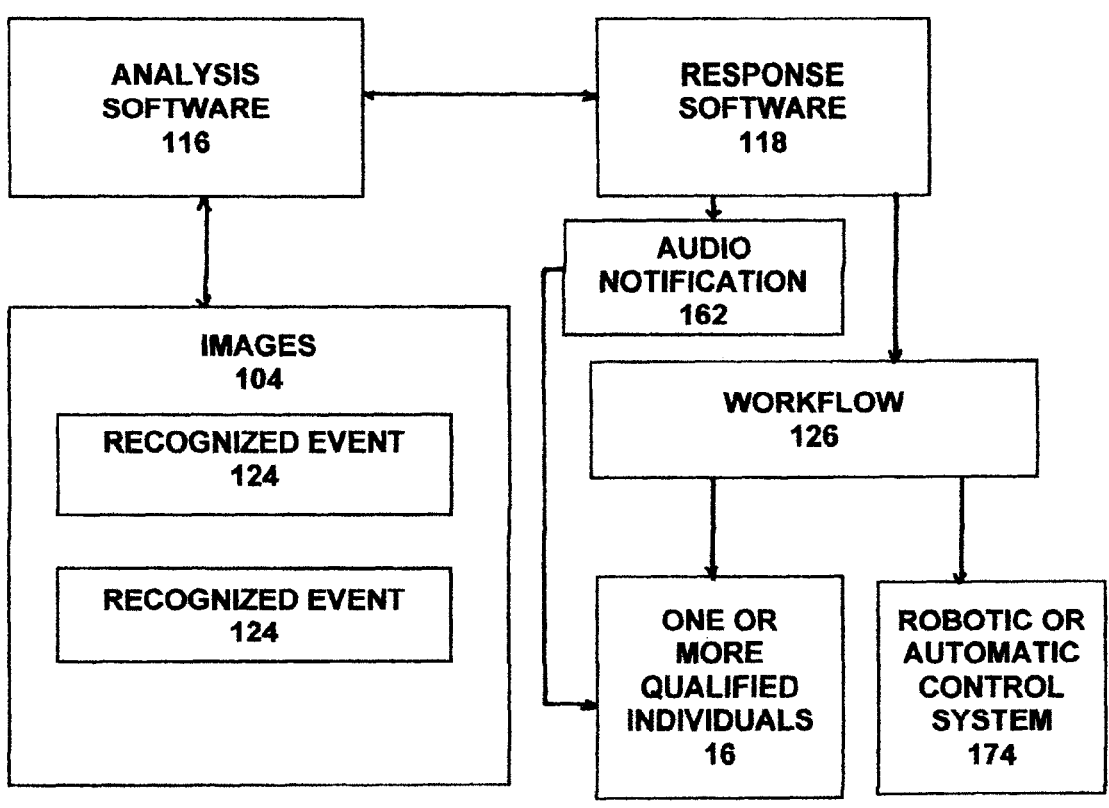
FIG. 2 is a schematic illustration showing the analysis software identifying one or more recognized events from images and cooperating with response software to transmit a workflow to one or more qualified individuals or to a robotic or automatic control system controlling a machine or machining or an industrial operation.

The system and method for managing workflow for observed events 100 of the subject invention is illustrated in FIG. 1, and includes one or more image capture apparatus 102 that operates to capture images (captured images) 104, including individual digital images or a video stream, of a location 10, a communication system 106 that operates to transmit the one or more images 104 to a control unit 108. The control unit 108 includes a memory 110 with one or more databanks 112 for storing information and software, including system software 114, analysis software 116, and response software 118, The control unit 108 further includes a processor 120 that operates to implement and operate the software. The image capture apparatus 102 includes one or more cameras 122 that operate to capture one or more images (or video stream) 104 and operates to transmit the captured one or more images (or video stream) 104 through the communication system 106 to the control unit 108. The image capture apparatus 102 can operate such that images (or video stream) is continuously being captured or operates periodically or operates when an event is detected (such as through one or more sensors). Once one or more images 104 is captured and transmitted to the control unit 108, as illustrated in FIG. 2, the analysis software 116 operates to detect and recognize an event (recognized event 124) and communicates with the response software 118 to initiate a response, such as determining or selecting a workflow (task) 126 based on the detected recognized event 124.

As used herein, the term "software" refers to any form of programmed machine-readable language or instructions (e.g., object code) that, when loaded or otherwise installed, provides operating instructions to a machine capable of reading those instructions, such as the control unit. The system software, analysis software and response software of the present invention can be stored or reside on, as well as be loaded or installed from, one or more floppy disks, CD ROM disks, hard disks or any other form of suitable non-volatile electronic storage media and can also be installed by downloading or other form of remote transmission, such as by using Local or Wide Area Network (LAN or WAN)-based, Internet-based, web-based or other remote downloading or transmission methods. It should be understood that the software can be a single program or can be a combination of existing system software that operate together under a framework to perform the operations described herein. Preferably, the control unit operates under the control of an operating system, such as the WINDOWS operating system developed by Microsoft Corporation or the MACINTOSH operating system developed by Apple Computer Corporation. It should be understood, however, that other operating systems could be utilized to implement the system software and the analysis software of the present invention. As used herein the term "image" includes individual images, a series of images and/or multiple images and streaming images (video streaming). As used herein, unless otherwise stated, images can be obtained from a single image capture apparatus or multiple image capture apparatus. As used herein, unless otherwise defined, the term "event" includes various conditions or objects shown in an image. For example, an event can be the location appearance (the location is dark (lights have gone off) or the location becomes lit (lights went on), motion is detected (an object is at a different position within the location), or an object has changed in appearance or color, or an object has appeared at a location or has disappeared from the location) or a change in the environment at the location, such as, but not limited to, water, smoke or fire. The event can also include any objects (including humans) that may appear in one or more images.

Figure 3:
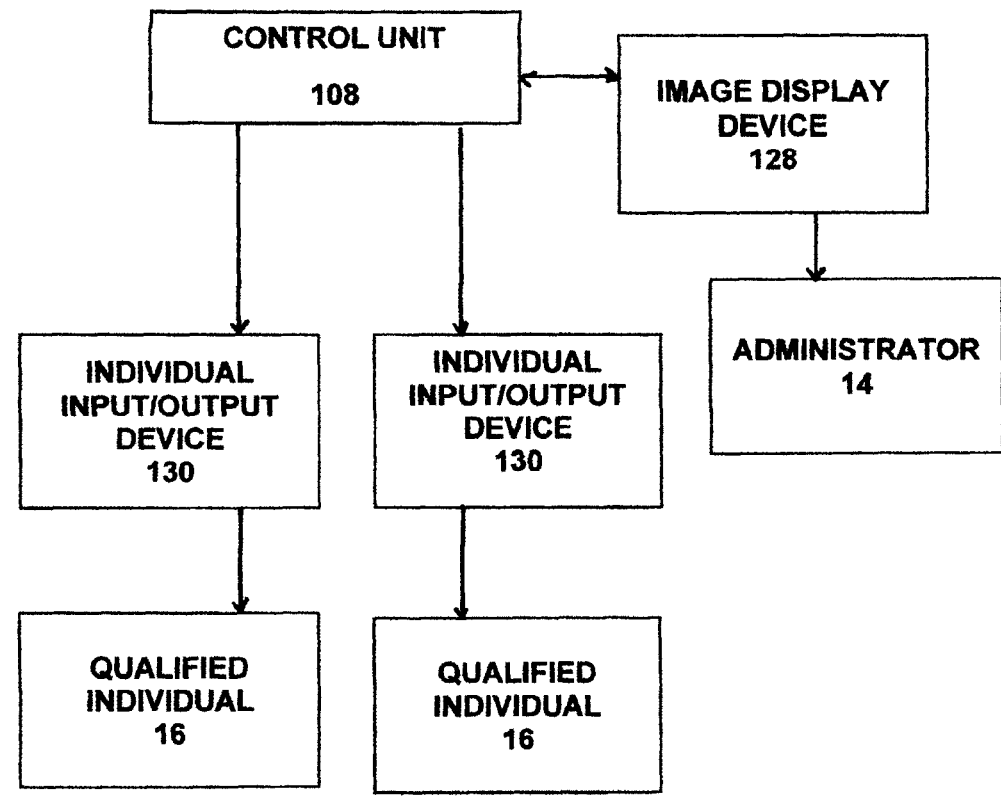
FIG. 3 is a schematic illustration showing the control unit in communication with an image display device and one or more individual input/output device used by a qualified individual.

As illustrated in FIG. 1, the image capture apparatus 102 includes one or more cameras 122 that operate to capture one or more digital images or a streaming digital set of images 104 (video stream) at a location 10 and is in communication with the control unit 108 through a communication system 106. As used herein, the term "communication system" can include the Internet, satellite systems, cable systems, telephone systems, television and radio transmission systems, fiber optic systems, microwave systems, asynchronous transfer mode systems, digital subscriber line systems, cellular systems, hardwire systems, and private networks. Referring to FIG. 3, the control unit 108 preferably is in communication with an image display device 128, like a touch screen, or any other suitable device that can accept and display information, such as a display, printer, and the like for receiving and displaying information, such as for review by an administrator 14. The control unit 108 is further in communication to one or more suitable individual input/output devices 130. It should be understood that the control unit can include various combinations of such conventional components, peripherals, and devices. Preferably, the input/output devices 130 are mobile such that an individual can carry the device thereby having access to the device, such as when the individual is at a facility where the location is situated or when the individual is "on call" or when the individual is responsible for performing work or services at the location. Such devices include, but are not limited to, cellular telephones, computers, personal digital assistants ("PDA"), video game consoles, tablets, digital wearable devices, such as smartwatches, and other devices that can be used by an individual in observing the captured images or receiving workflows (tasks) or messages.

Figure 4:
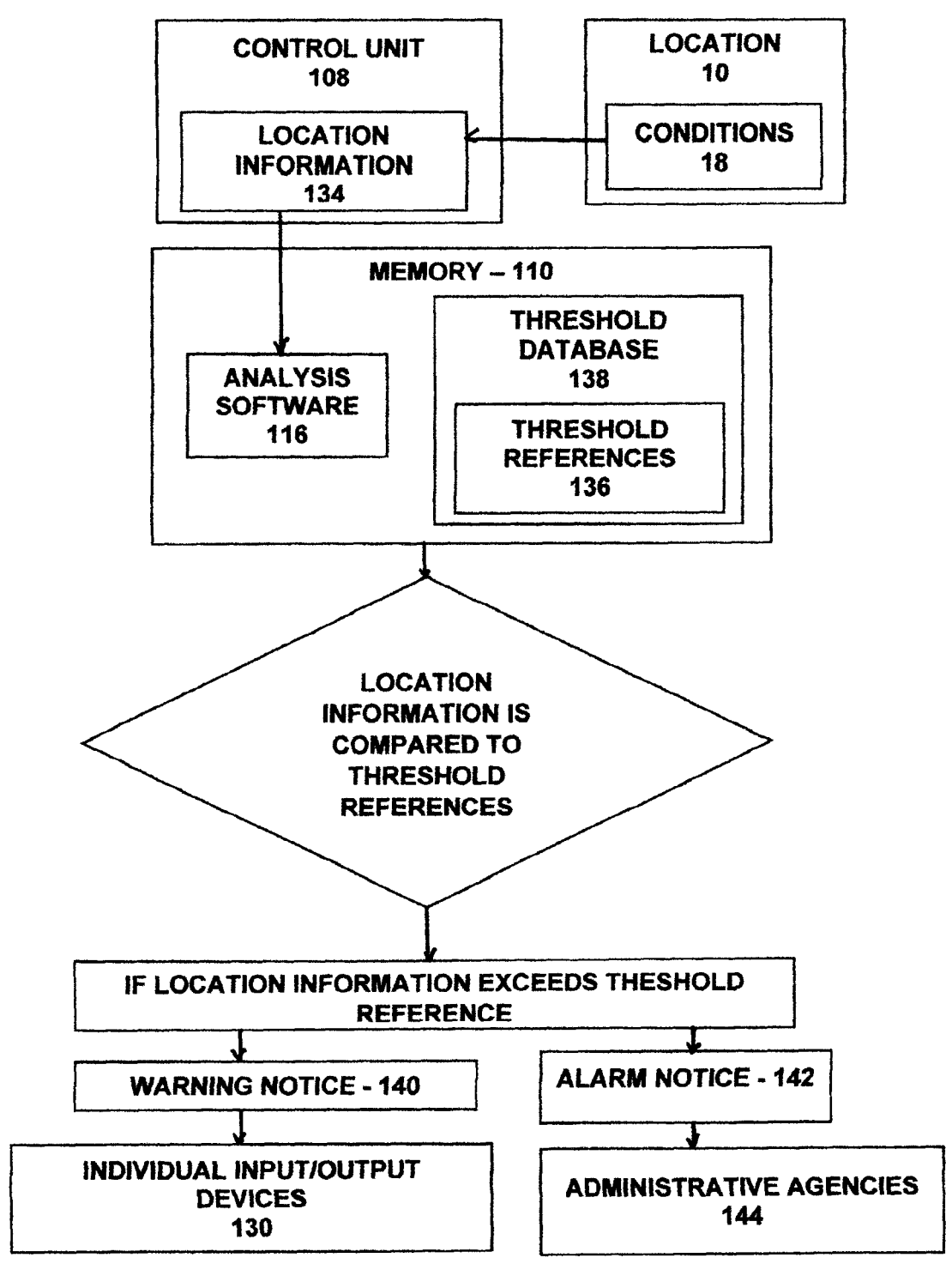
FIG. 4 is a schematic illustration showing the control unit communicating with analysis software that compares location information with threshold references and if the location information exceeds a threshold level, a warning notice and/or an alarm notice is transmitted.
Figure 5:
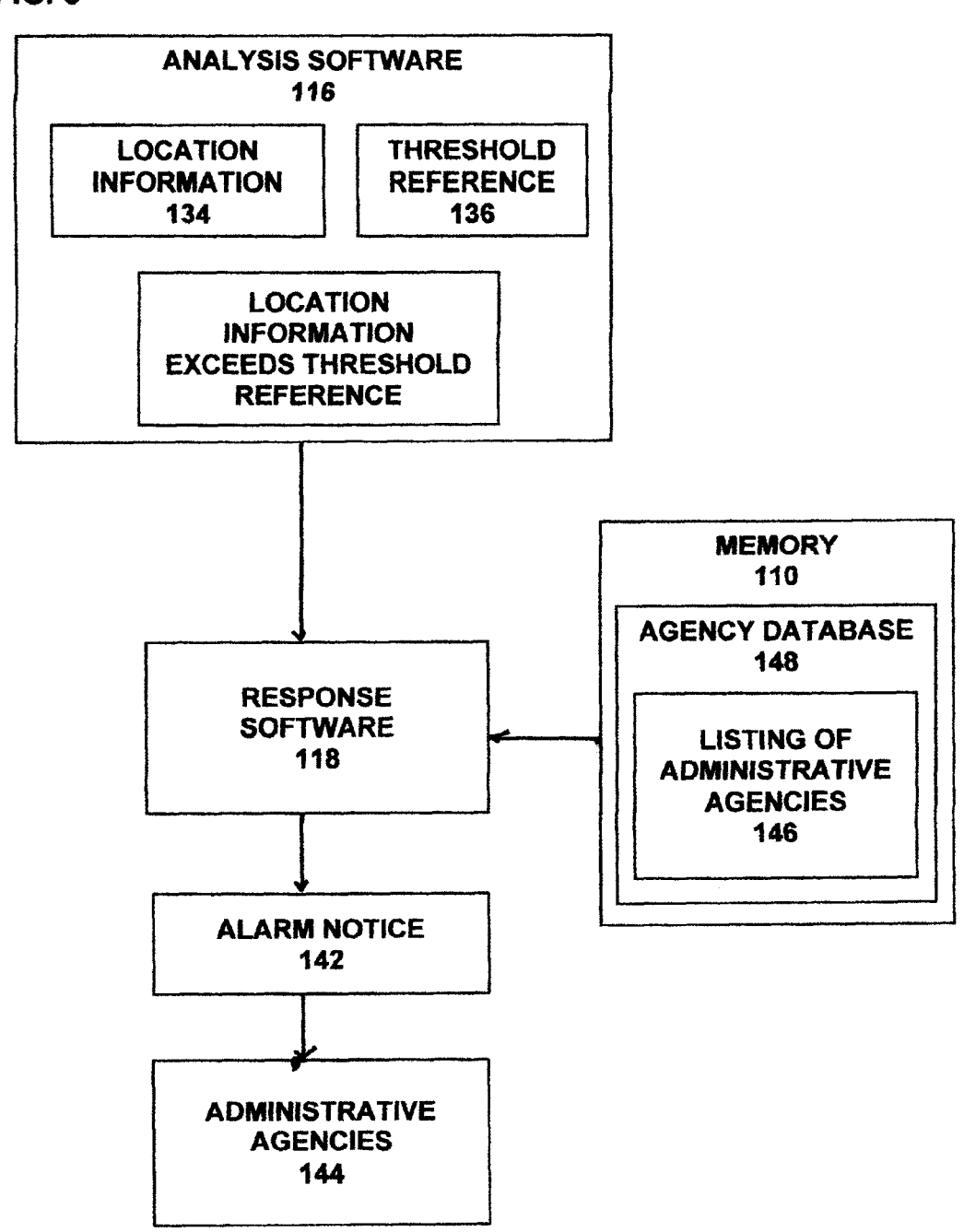
FIG. 5 is a schematic illustration showing the analysis software comparing location information with threshold references and determining if the location information exceeds the threshold reference and if so, the analysis software cooperates with response software that accesses the listing of administrative agencies listed in the agency database and identifies one or more administrative agencies that should receive an alarm notice based on the location information and operates to transmit the alarm notice to the identified administrative agencies.

In a preferred embodiment, as illustrated in FIGS. 1 and 4, an image capture apparatus 102 includes one or more condition sensors 132 that operate to obtain location information 134 concerning the conditions 18 at the location 10. The one or more condition sensors 132 may include, but are not limited to, temperature sensors, humidity or water sensors, noise sensors, motion sensors, gas sensors, smoke sensors, and the like, that operate to obtain location information 134 (such as, but not limited to, environmental conditions) and are in communication with the communication system 106 such that the location information 134 is transmitted to the control unit 108. In a preferred embodiment, when the control unit 108 receives location information 134 it operates to direct the analysis software 116 to compare the location information 134 to threshold references 136 stored in a threshold database 138 and if the location information 134 exceeds a pertinent threshold reference 136 for that location, it directs the response software 118 to transmit a warning notice 140 to one or more individuals input/output device 130. Preferably, the response software 118 further operates to transmit one or more images 104 showing the location 10 together with the warning notice 140 thereby allowing the one or more individuals to view the location 10 and better access the condition at the location 10 and the need to perform any corrective measures (workflows). In another preferred embodiment, if the location information 134 at a location 10 exceeds a threshold reference 136, the image capture apparatus 102 at the location 10 operates to transmit images 104 of the location 10 to the control unit 108 which directs the analysis software 116 to analyze the images 104 and operate to detect and identify one or more recognized events 124 contained within the images 104. In another preferred embodiment of the invention, if the location information 134 exceeds a threshold reference 136, the response software 118 operates to transmit an alarm notice 142 to one or more administrative agencies 144. It should be understood that the alarm notice can be in the form of a text, Email or other similar systems, or to a call in center, such as a 911 operator, or can be tied in directly to an alarm system at the administrative agency. In another preferred embodiment of the invention, as illustrated in FIG. 5, if the location information 134 exceeds a threshold reference 136, the response software 118 operates to identify one or more appropriate administrative agencies 144, such as by utilizing a listing of administrative agencies 146 stored in an agency database 148 that correspond to recognized events and transmits an alarm notice 142 to the identified one or more administrative agencies 144.

Figure 6:
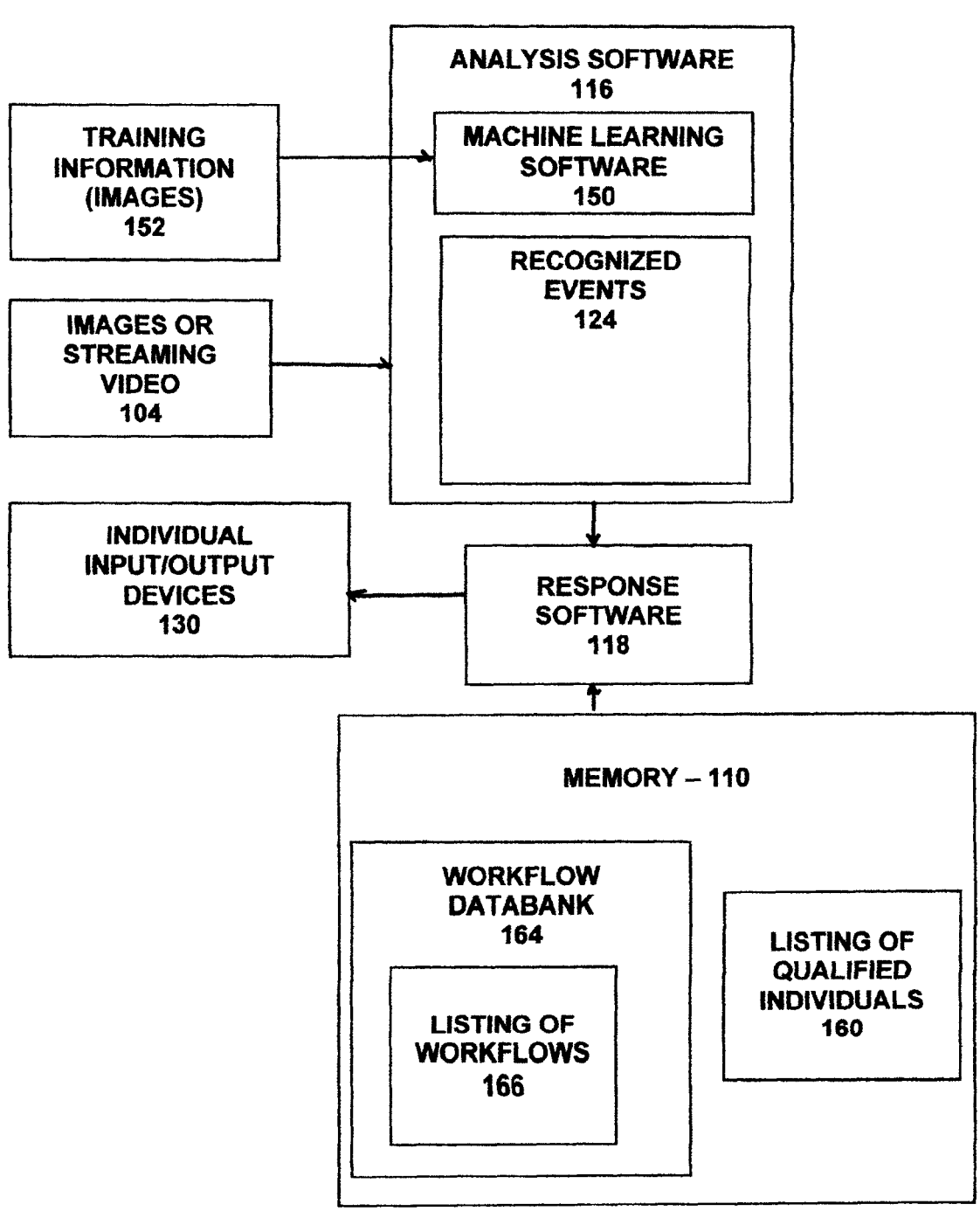
FIG. 6 is a schematic illustration showing analysis software having machine learning software that receives training information until the machine learning software is trained (trained analysis software) and images or streaming video is fed into the trained analysis software which operates to detect an event or object and communicates with response software to transmit a workflow (task) to one or more individual input/output devices so that a response to the event can be performed.
Figure 7:
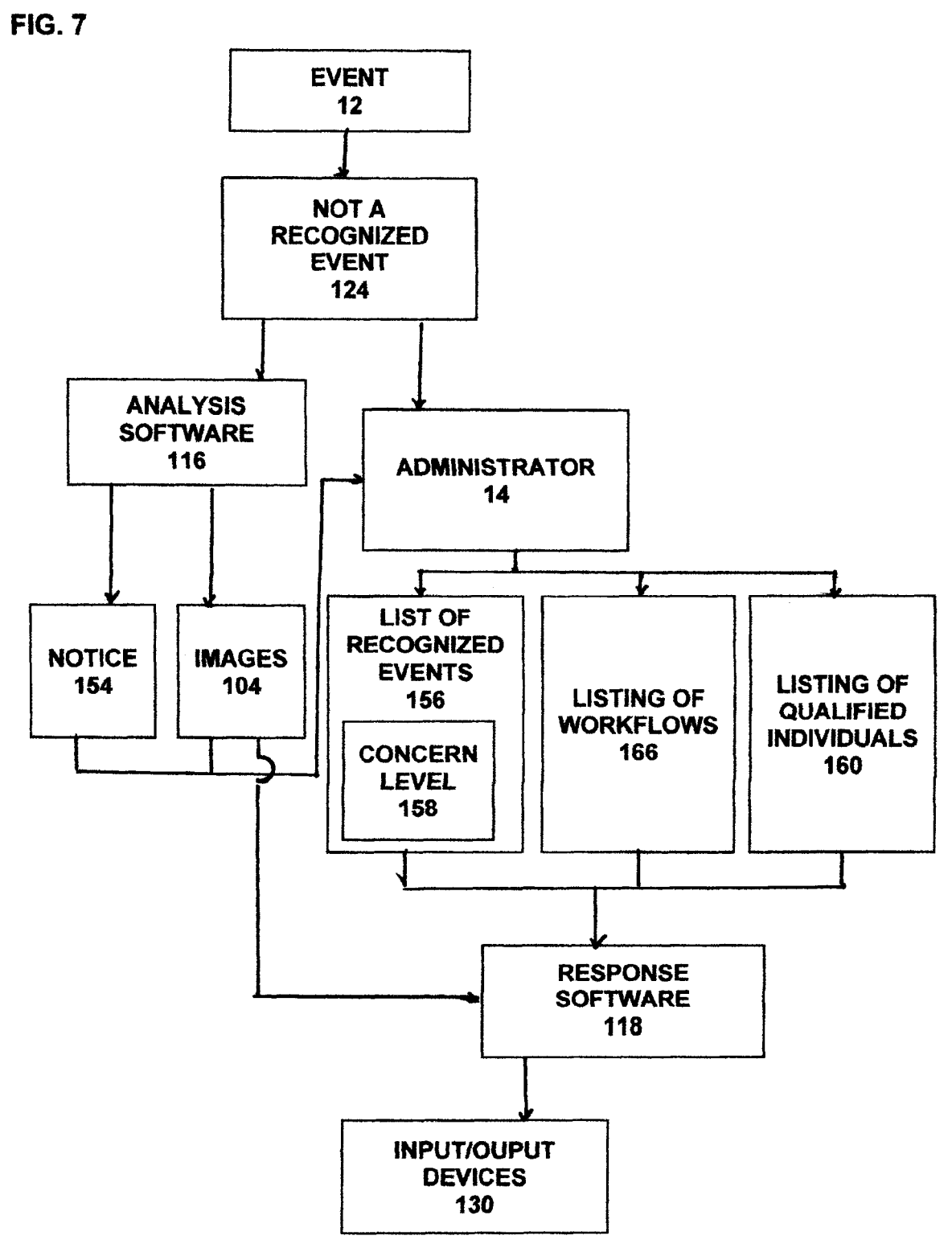

As illustrated in FIG. 6, the analysis software 116 includes conventional machine learning software (MLS) 150 that uses training information (data) 152 that allows the MLS 150 to create neural networks that possess all of the pixels that make up images 104 and are presented with training information 152 having multiple images of events that have been identified (recognized events 124), such as manually by individuals placing boxes around each event and event (tagging), so that the networks can learn and recognize similar events and can detect patterns in the training material allowing the MLS to identify other patterns and make determinations automatically. Thus, in operation, once a plurality of images containing events have been tagged and are now recognized events 124, an underlying Deep Neural network analyzes the images for various patterns from the numerous combinations of pixels on the images and the trained MLS 150 operates in a statistically and acceptable manner to detect and identify recognized events 124 (what it is "trained" to detect). It should be understood that numerous MLS systems have been developed and one skilled in the art can select the MLS system that is best suited for analyzing Images and events contained therein based on the particular use of the images. It should also be understood that recognized events 124 should be under various lighting conditions and should be seen in various angles of view as would be recorded by the image captured apparatus at the location. As illustrated in FIG. 7, If an event 12 is not a recognized event 124, the analysis software 116 operates to transmit a notice 154 to an administrator 14 that an event 12 that is not a recognized event 124 has been detected. The administrator 14 can then determine if a workflow 126 should be listed in the listing of workflows 166, and if so, the response software 118 operates to use the newly added workflow 126 and identifies one or more qualified individuals 16 from the listing of qualified individuals 160 and transmits the workflow 126 to the individuals input/output devices 130. Further, if the event 12 is not a recognized event 124 the analysis software 116 operates to transmit a notice 154 and one or more of the images 104 to the administrator 14 whereby the administrator 14 can add the event to a list of recognized events 156 (making the event 12 a recognized event 124) and assign a concern level 158 to the new recognized event. The response software 118 can then operate to identify one or more qualified individuals 16 to respond to the new recognized event, such as by accessing the listing of qualified individuals 160 stored in the memory 110 and transmits a workflow 126 and preferably images 104 of the event 12 to the individual input/output devices 130 of the one or more identified qualified individuals 16 in response to the new recognized event 124. It should be understood that the one or more qualified individuals may be individuals that have been assigned, such as listed on the listing of qualified individuals who are "qualified" for responding to unrecognized events. Such qualified individuals can then review the event, such as images, and determine a workflow to handle such a new previously unrecognized event and the individuals to respond. It should be understood that if the event is one that there is a great urgency, such as a condition sensor indicates a serious concern, such as detection of fire or smoke or an injury, or where an image shows a serious concern, the event can be handled immediately before the event is converted to a recognized event (a higher concern level 158 that other recognized events). In a preferred embodiment, the analysis software 116 cooperates with the response software 118 that are recognized events 124 detected and identified by the analysis software 116 causes the analysis software 116 to direct the response software 118 to transmit a workflow 126 to one or more identified qualified individuals 16, the transmitted workflow 126 includes one or more images 104 showing the recognized event 124. In another preferred embodiment, the analysis software 116 operates to identify (highlight) the recognized event 124 shown in the one or more images 104 that is being transmitted with the workflow 126. It should be understood that the workflow 126 being transmitted to the individual input/output devices 130 of the one or more identified qualified individuals 16 can include audio, such as an audio description of the recognized event and concern level (such as expressed audio by the administrator) as well as an audio notification 162 that a workflow 126 has been transmitted to the individual's input/output device 130.

In a preferred embodiment of the invention, the analysis software 116 operates to continuously (or periodically) analyze the images 104 being transmitted to the control unit 108 to identify recognized events 124. When a recognized event 124 has been detected, the analysis software 116 operates to direct the response software 118 to communicate with a workflow databank 164 stored in the memory 110 which contains a listing of workflows (tasks) 166 each corresponding to a different identified recognized event 124. For a non-limiting illustration, If the analysis software detects that a person has entered a location (an event), the analysis software operates to identify the event as a recognized event and directs to response software to access the workflow databank and select a workflow (task) that corresponds to the recognized event. The response software can then access the listing of qualified individuals, that includes a listing of their qualifications, work schedules and other pertinent information, and then operates to identify and transmits a workflow to the one or more individuals that are qualified, based on their qualifications (interacting with the person who entered the location). For another non-limiting illustration, if a box or container (an object) has been moved to a location and is detected and identified by the analysis software as a recognized event, the response software is directed to access the listing of qualified individuals and identify one or more qualified individuals, such as a forklift operator, and sends a workflow (such as a notice) to the one or more qualified individuals that a box or container has arrived and needs to be picked up and moved.

Figure 8:
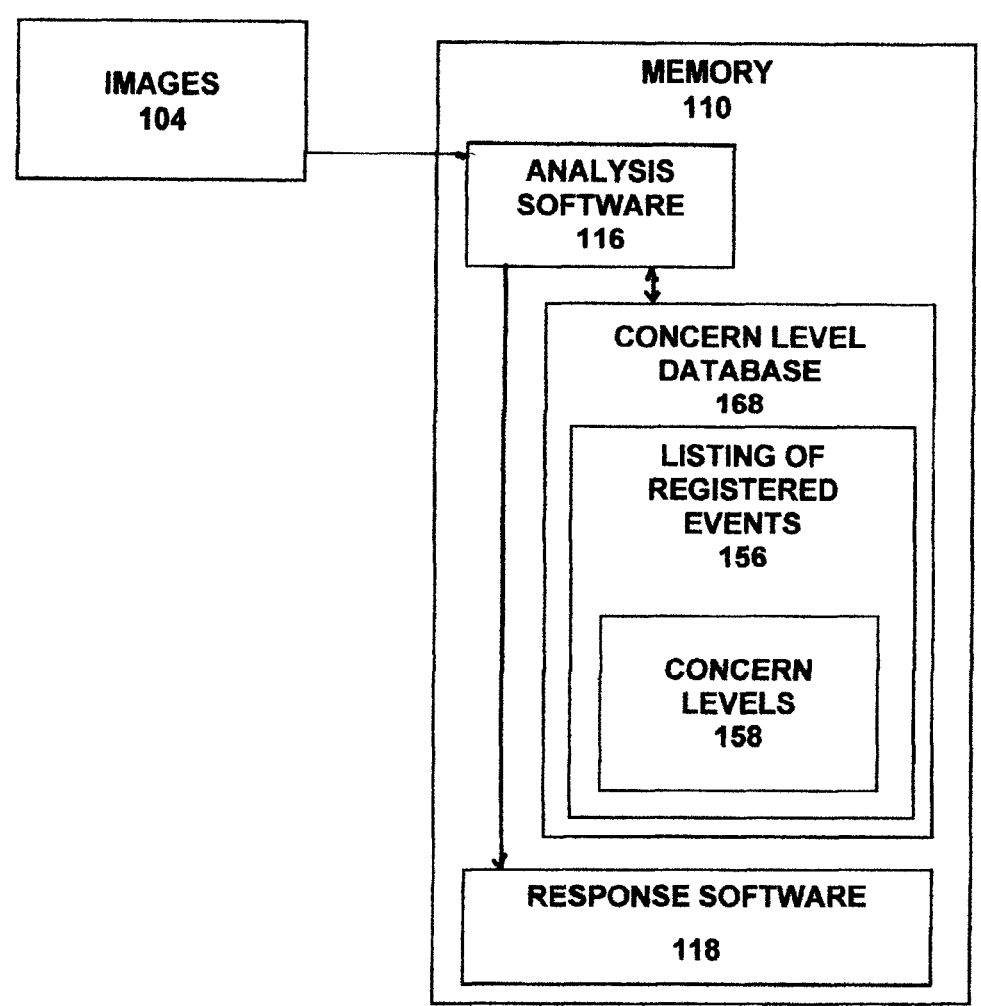
FIG. 8 is a schematic illustration of the system and method of FIGS. 1 and 2 whereby a concern level is assigned to an identified event and the workflow is assigned based on the concern level.

In a preferred embodiment of the invention, as illustrated in FIG. 8, the memory 110 includes a concern level database 168 having a listing of various recognized events 124 each having a concern level 158. In operation, the analysis software 116 operates to continuously (or periodically) analyze the images 104 being transmitted to the control unit 108 to identify events 12 and registered events 124 contained therein. It should be understood that the analysis software operates automatically when images are received from one or more image capture apparatus. Thus, multiple events can be identified in the same images. For a non-limiting illustration, if the analysis software detects and identifies a recognized event (such as an object or smoke at a location), the analysis software accesses the concern level database and identifies the concern level for the identified recognized event. Thus, the analysis software operates to identify the recognized event and a concern level for the recognized event. The analysis software then directs the response software to access the listing of qualified individuals and identifies one or more qualified individuals, such as security officers, that are qualified for responding to the recognized event and sends a workflow to the one or more qualified individual's input/output device that a recognized event has been detected. In a preferred embodiment, if the concern level for the recognized event is significant (the concern level is high enough that the transmitted workflow should performed expediently or immediately or within a predetermined amount of time as indicated in the workflow) to mitigate the impact of the event. Thus, the one or more qualified individuals will be aware of the urgency (concern level) of the event and can react accordingly (for example, stop performing a workflow for a lower concern level event and begin working on a workflow for the higher concern level event). In another preferred embodiment, if the concern level is of a certain level, the response software can operate to transmit an alarm to an external administrative agency, such as a fire station or police station. For a non-limiting illustration, if the recognized event is smoke at a location, the analysis software directs the response software to access the workflow databank and depending on the concern level can operate to transmit an alarm notice to one or more administrative agencies, such as a police station or a fire station, that smoke has been detected at a location. In another non-limiting illustration, the analysis software operates to detect and identify an event as a recognized event having a concern level. Depending on the concern level for the recognized event, the analysis software operates to direct the response software to select the proper workflow (task) and transmits the workflow to one or more qualified individuals.

In another preferred embodiment of the invention, the analysis software 116 operates to detect multiple recognized events 124 in a sequence of images 104. The analysis software 116 can then operate to access the list of recognized events 156 that includes recognized events 124 in the form of sequence of events, wherein the sequence includes a concern level 158 associated with particular sequence that the recognized events occurred or the time period between the sequence of the recognized events or the time duration of the sequence of recognized events. For a non-limiting illustration, if a customer enters a location, such as a retail establishment, the analysis software operates to identify the customer as a recognized event (event 1). A store cashier is a second recognized event (event 2). Since a cashier (event 2) should have been identified before the customer (event 1) (recognized event 2 should have occurred prior to recognized event 1), the time sequence of the events would result in the recognized events having a high concern level, thus a notice to an administrator can be transmitted for future analysis and new procedures implemented. In another non-limiting illustration, a customer enters a location, such as a retail establishment, the analysis software operates to identify the customer as a recognized event (event 1) and can use the images to determine that the customer (event 1) has not changed in the images (has remained at the same place for a certain period of time) before the analysis software detects a sales clerk as a recognized event (event 2). The analysis software can operate to use the time period between the recognized events which the sequence would be listed as having a high concern level, thus a notice can be transmitted to an administrator. Further, if the recognized event (event 1) is detected but after a certain amount of time no recognized event (event 2) has been detected, the concern level would be high and a workflow (task) can be sent to other identified qualified individuals (other sales clerks) to attend to the customer. In another non-limiting illustration, the location is a manufacturing location and a worker, detected and identified as a recognized event (event 1) by the analysis software, is working on a product, detected and identified as a recognized event (event 2) by the analysis software. If the analysis software determines that the worker has remained working on the product for a time period that exceeds a threshold reference, the sequence would have a high concern level. Accordingly, a notice can be sent to an administrator and a workflow can be transmitted to other identified qualified individuals that the work is slower than required and that the worker needs assistance. Accordingly, it should now be apparent that the analysis software can operate to monitor and analyze images and detect and identify events as well as analyzing event sequences and time between events that can be used to assign workflows (tasks) to qualified individuals that will resolve issues, minimize risk, and increase the efficiency of various types of operations.

Figure 9:
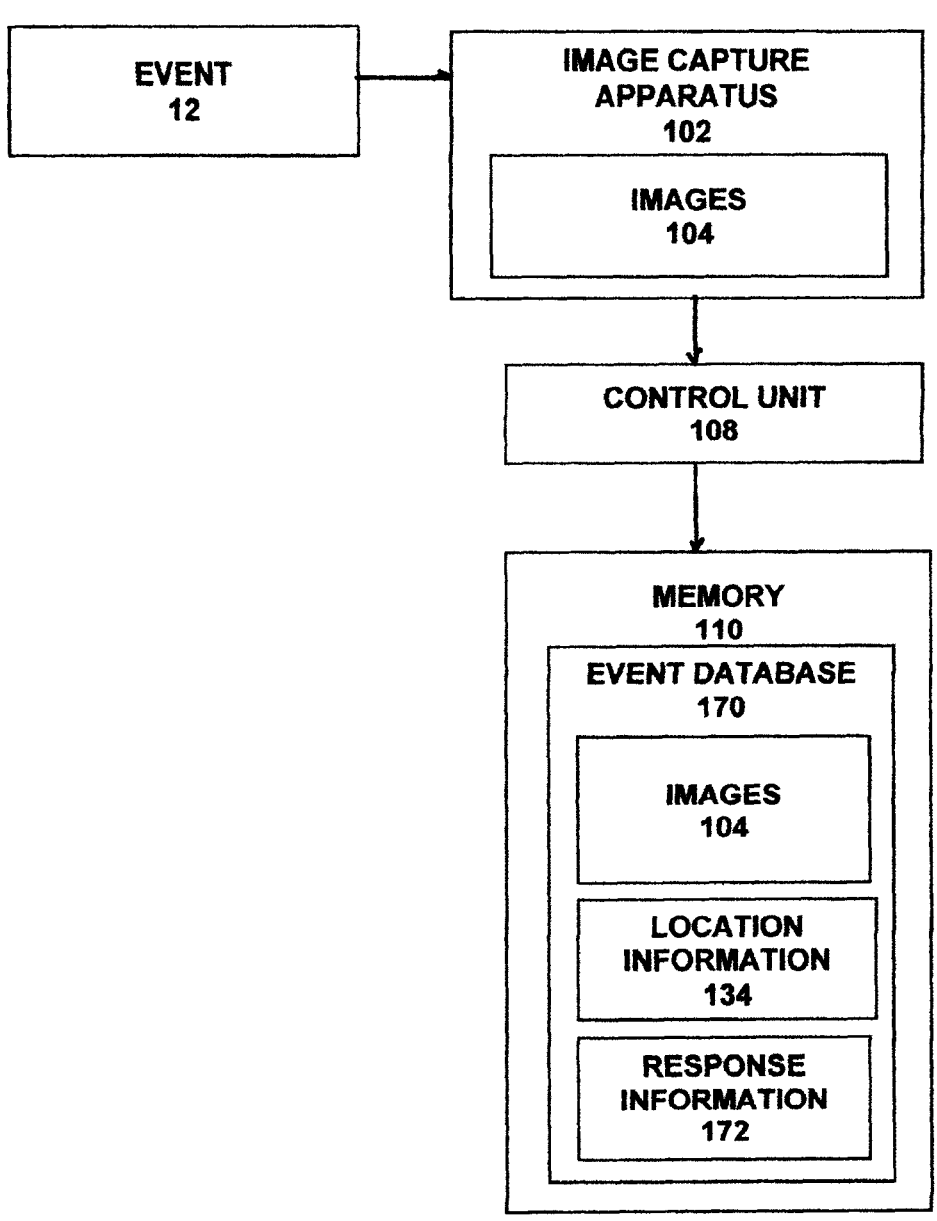
FIG. 9 is a schematic illustration showing the image capture apparatus capturing images and/or a video stream and whereby the control unit stores the images, location information and response information in an event database for future analysis.

In a preferred embodiment of the invention, as illustrated in FIG. 9, when an event 12 is detected by the image capture apparatus 102, or by a condition sensor 132, the image capture apparatus 102 automatically operates to capture images 104 and transmits the images 104 to the control unit 108 which stores the images 104 in an event database 170 in the memory 110 and records the location information 134, such as the specific location, location conditions, time frames, and any other pertinent information and stores the location information 134 in the event database 170. The control unit 108 further operates to monitor and records and stores response information 172 in the event database 170, such as the individuals notified, the time of any notifications, warnings, etc., administrative agencies notified and the time of such notifications, response (workflow) provided to the qualified individuals, the response (workflows) performed, the time frame that the workflow(s) was performed, and other pertinent information. It should now be apparent that the response information 172 can then be utilized in determining the effectiveness of the workflow, the productivity of the individuals performing the workflow and if improvements or modifications need to be made to the workflow(s) responding to an event.

It should now be apparent that the system and method for managing workflow for observed events can be used to monitor conditions at various locations. Such events can include, but not limited to, the arrival of customers or objects, the detection of unauthorized individuals entering a location, a condition (such as smoke, water, or fire, etc., taking place at a location), and the arrive of an object at a location, etc. It should also now be apparent that events at a location can also be monitored and detect certain events, such as an individual being injured (such as by falling, or acting inconsistent, i.e., lying on the floor) to recognized behavior and an appropriate response (workflow) can be transmitted to a qualified individual. It should also now be apparent that the system and method of the subject invention can also be used for use in manufacturing. For a non-limiting illustration, if a machining operation is to occur in a series of steps (events), the system can operate to detect that a procedure (response or workflow) for a manufacturing step has been performed and has been performed properly or at an appropriate time. If not, a qualified individual can be identified and notified or a new workflow can be implemented to correct a problem and mitigate any undesired consequence. In another non-limiting illustration, it should be apparent that if an event is detected and other events are detected at a later time period, the system can be utilized to determine if any of the detected events are related and, if so, the analysis software can operate to determine how the events are related which can result in more effective workflows (procedures) to be put into effect to avoid future problems and difficulties.

It should now be apparent that the subject invention is a system and method for managing workflow for observed events. Preferably, the system includes one or more image capture apparatus that takes images at a location and transmits the images to a control unit having analysis software that operates to monitor the images and if an event is detected it operates to determine if the event is a recognized event and if the event is a recognized event the analysis software operates to direct the control unit to utilize the response software that operates to identify one or more individuals qualified to respond to the event and transmits a notification (workflow) to the one or more individuals that a response to the event must be performed. The system further operates to identify a concern level for an event and uses the concern level to determine a response and depending on the concern level, a notice or alarm can be sent one or more individuals qualified for perform the response and can further to one or more administrative agencies.

In a preferred embodiment of the invention, if the event is not a recognized event, the analysis software operates to transmit a notice and one or more of the images to an administrator and whereby the administrator can identify the event as a recognized event and provide it with a concern level and whereby the response software can operate to identify one or more individuals qualified to respond to the new recognized event and can transmits a notification (workflow) to the one or more qualified individuals that a response to the new recognized event must be performed.

In a preferred embodiment of the invention, if a recognized event has been detected and if the concern level is of a specific level, the response software operates to transmit an alarm notice to one or more administrative agencies.

In another preferred embodiment of the invention, if the concern level is of a specific level, the response software uses the event to identify the one or more administrative agencies and the response software will further operate to transmit an alarm notice to the identified one or more administrative agencies.

In another preferred embodiment of the invention, the one or more image capture apparatus includes or cooperates with one or more condition sensors that operate to monitor conditions at the location and uses the conditions at the location to identify a concern value to the event. If the concern level is of a specific level, the response software operates to identify one or more administrative agencies and operates to transmit an alarm notice based on the event and the concern level.

It should now be apparent that the system and method of the subject invention operates such that conditions at various locations are continuously or periodically monitored and when an event of interest is detected, the system operates to determine if it is an actionable recognized event and if so, the system automatically identifies the event and can notify management and/or identifies and notifies a qualified individual or a number of qualified individuals and assigns workflows with regard to the event. Further, the system and method operate to detect and identified events having assigned concern levels that can be used to assign workflows and depending on the concern level can prioritized the workflows.

It should also now be apparent that workflows can vary depending on the recognized event. Such workflows can, for a non-limiting example, a workflow can include a qualified individual or group of individuals delivering or retrieving objects to or from a location; having one or more qualified individuals react with other individuals (such as a sales clerk reacting with a customer); one or more qualified individuals performing a task or taking corrective action at a location (such as making a repair or handling a condition at a location); responding to an emergency at a location; providing assistance to an individual at a location. In addition, workflows can include an individual, or in some cases the workflow can be done automatically without the need of an individual, such as by the use of robotic systems or automatic systems. For a nonlimiting example, the response software may determine that no qualified individuals are needed to perform a workflow but instead the response software can interact with other software or automated systems that will perform a required workflow. As shown in FIGS. 2 and 3, once one or more images 104 is captured by the image capture apparatus 102 and transmitted to the control unit 108, or if a condition sensor 132 transmits location information 134 to the control unit 108 that an event has occurred at the location, the analysis software 116 operates to detect and recognize an event (recognized event 124) and communicates with the response software 118 to initiate a response, such as determining or selecting a workflow (task) 126 based on the detected recognized event 124. It should be understood that the response software 118 can operate such that no qualified individuals are identified or that no qualified individuals are required to perform the workflow 126 but instead the workflow will be performed by a robotic or an automatic control system 174. Accordingly, the response software 118 cooperates with the robotic or automatic control system 174 to perform the workflow 126. Such robotic or automatic control systems 174 for example can be a standard automation controller, such as a programmable logic controller (PLC) that operates using a high-level programming language to generate control commands that are passed to the various individual component control systems and can also comprise various other computing hardware such as central processing units (CPU's), graphics processing units (GPU's), digital signal processors (DSP's), microprocessors, field programmable gate arrays (FPGA's), very large scale integration (VLSI) systems, complex programmable logic devices (CPLD's), or systems on chips (SOC's), and/or other such data processing and/or control devices. The workflow can include instructions or software modifications that are used to modify the programming of the robotic or automatic control system of a machine or machining or industrial operation. For a non-limiting illustration, the workflow could provide modifications to the programming that would speed up or slow down all or part of a machining operation or an industrial operation or could turn on or off or adjust certain robotic or automated systems at a location or a robotic apparatus could be dispatched automatically to a location in response to a recognized event.

Identifying Recognized Events Using Color

Figure 10:
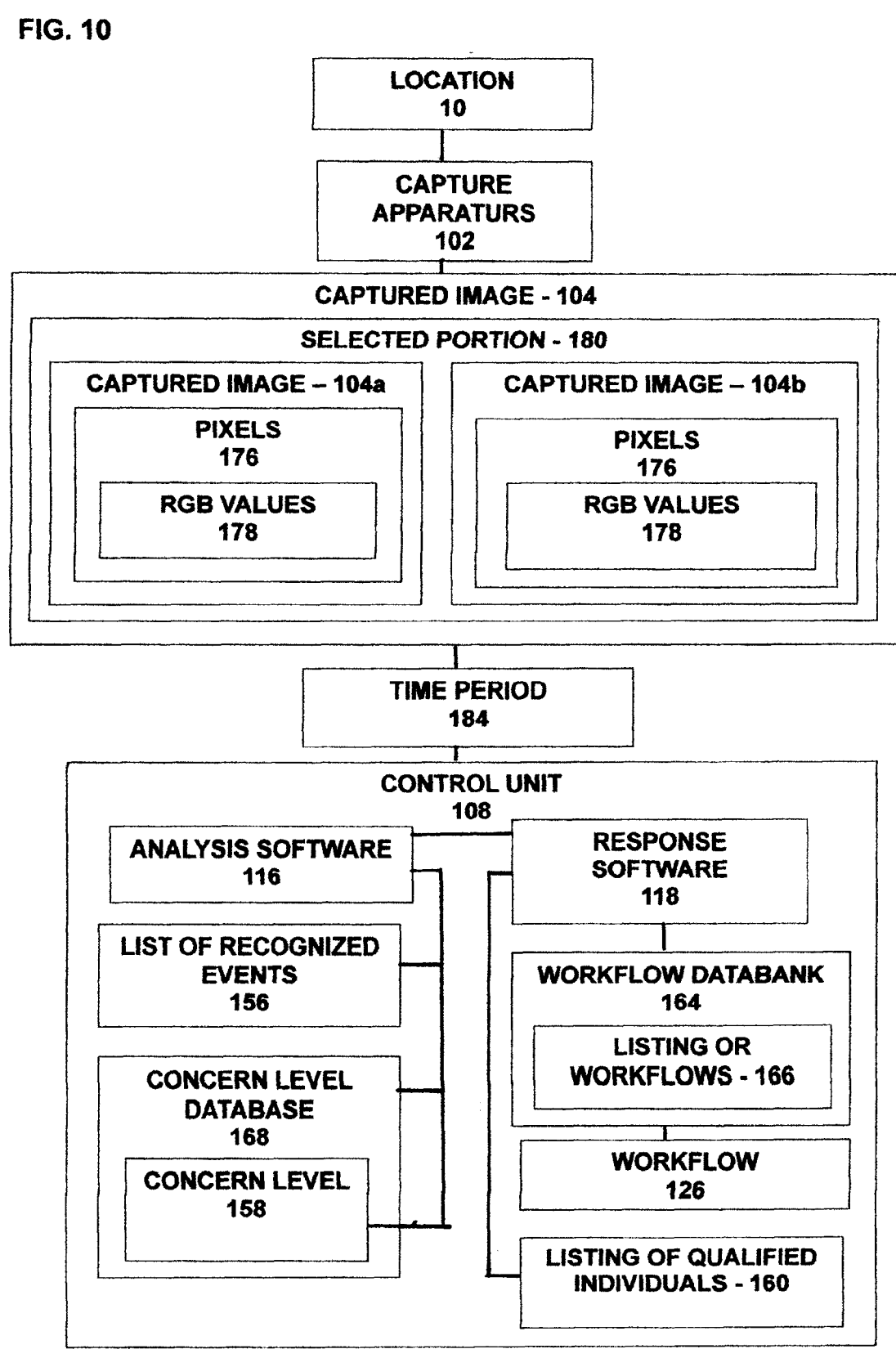
FIG. 10 is a schematic illustration showing a control unit having analysis software and response software, a list or recognized events, a concern level database, a workflow databank having a listing of workflows for recognized events, and one or more capture apparatus that captures a plurality of color captured images formed from pixels having a RGB value and the analysis software using the pixels, RGB Values and preferably a time period between captured images to identify a recognized event from the list of recognized events and a concern level from the concern level database and whereby the response software interacts with the analysis software to select a workflow from a listing of workflows.
Figure 11:
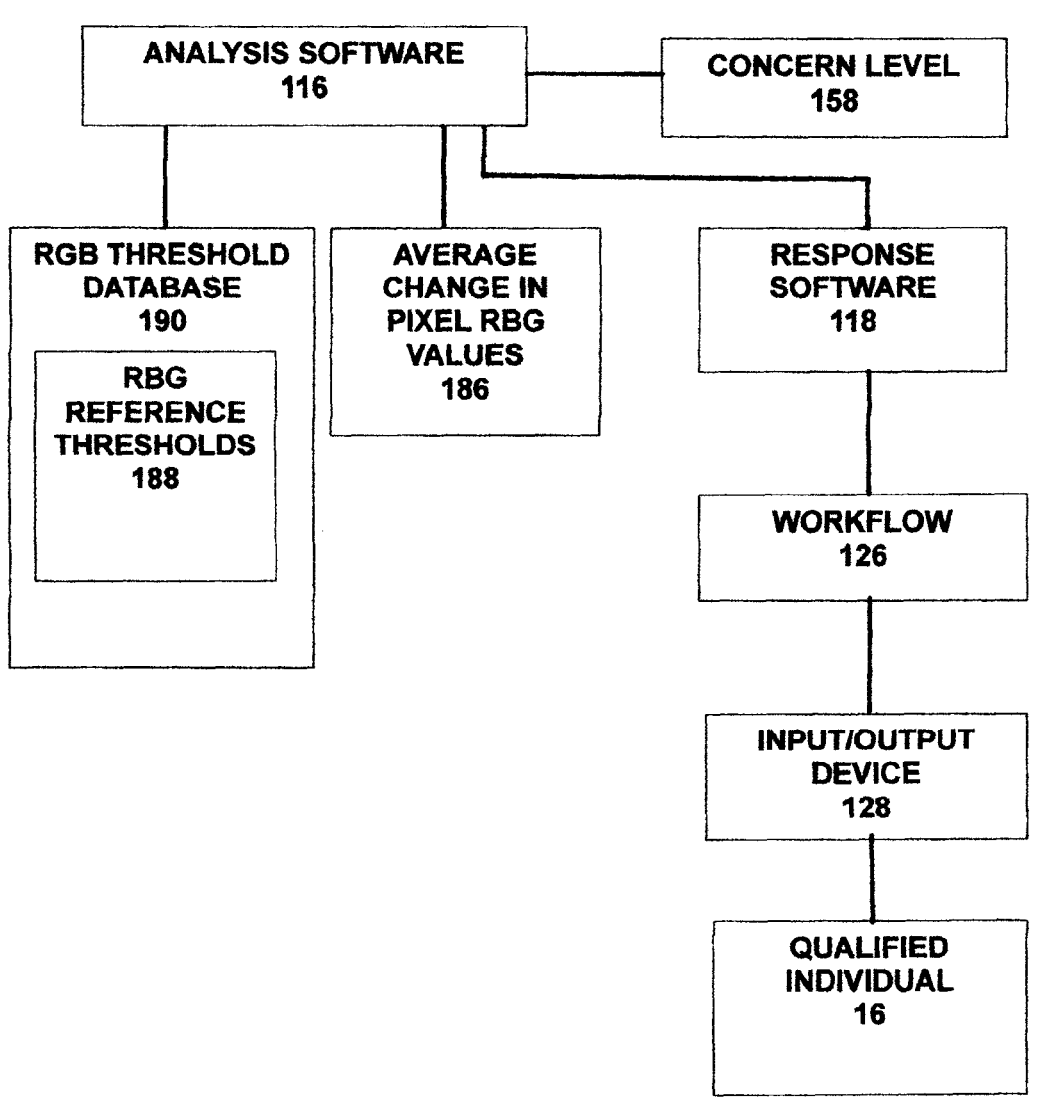
FIG. 11 is a schematic illustration showing the analysis software calculates the average Pixel RBG value from a color captured image and compares it to a RBG threshold stored in a RBG threshold database and if the average Pixel RBG value exceeds a RBG threshold, the analysis software identifies a recognized event and determines a concern level and interacts with the response software to select and initiate a workflow.

In another preferred embodiment, as illustrated in FIGS. 10 and 11. the one or more image captured apparatus 102, the images are in the form of color images, at a location 10 and transmits the color captured images 104 to the control unit 108. It should be understood that the images can include an object, such as a room, an outside area, an article (such as a machine, equipment), a part (such a part of a machine or equipment, or a portion of a machine or equipment, a surface, a shelf, or other similar structures and devices). The one or more image captured apparatus 102 preferably are visible light cameras capable of taking images of shape, form and color of objects. The analysis software 116 utilizes a color captured image 104 by examining color pixels 176 and the RGB values (color values) 178 creating the color captured image 104. The analysis software 116 analyzes the pixels 176 and the pixels RGB values 178 of the color captured image 104, preferably, for a selected portion 180 of the color captured image 104, and detects any changes in the pixels 176 and their RGB values 178 occurring between a current color captured image 104a to a previously color captured image 104b to identify a recognized event 124 (a detected color change). The analysis software 116 then compares the recognized event 124 with a list of recognized events 156 (baseline color changes) to identify the recognized event 124. The analysis software 116 then communicates with the response software 118 to identify a workflow 126, such as by use of a list of workflows 166, and initiate the response (workflow) 126 based on the identified recognized event 124. Preferably, the selected workflow 126 is based on the degree or the color change (the amount of color change, such as the change in the RGB values) to select the proper workflow 126. In a preferred embodiment, the analysis software 116 determines a time period 184 between the color captured image 200a and the previous color captured image 200b and communicates with the response software 118 to initiate a response (workflow) 126 based on the identified recognized event 124 and the time period 184. In a preferred embodiment, based on the identified recognized event 124 and/or based on the identified recognized event 124 and the time period 184, the analysis software 116 determines a concern level 158. Preferably, the concern level 158 is based on the degree of color change. The analysis software 116 then directs the response software 118 to access a listing of qualified individuals 160 and identifies one or more individuals (qualified individual(s) 16) that are qualified for performing the response (workflow) 126 and sends the workflow 126 and the concern level 158 to the one or more identified qualified individual's input/output device 130 that a recognized event 124 has been identified and a workflow 126 needs to be performed. In a preferred embodiment, the analysis software 116 compares the average RBG value 186 of the pixel's RBG values 178 to RBG reference thresholds 188 stored in a RGB threshold database 190 stored in the memory 110. If the average RBG value 186 is below a reference RBG reference threshold 188 for the recognized event 124, the analysis software 116 reduces the concern level 158 for the workflow 126 and continues to monitor the changes in the pixel's RBG value 178 until the average RBG value 186 of the pixel's RGB values 178 becomes greater than the RBG reference threshold 188 for the recognized event 124. Once the average RBG value 186 in the pixels' RGB values exceeds the RGB reference threshold 188 for the recognized event 124, the analysis software 116 then compares the recognized event 124 with a list of recognized events 156 (baseline color changes). The analysis software 116 then communicates with the response software 118 to identify a workflow 126 initiate a response (workflow) 126 based on the identified recognized event 124.

For a non-limiting illustration, one or more image capture apparatus takes color images of working equipment and transmits the color captured images to the control unit. The analysis software monitors the color captured images by examining the pixels of the each color captured image and determines if there is a change in the pixel's RGB values or the average change of the pixel's RGB values between a first image and a previous time acquired color captured image, such as for example if a hot spot forms that produces a color change or a part dislocates causing a color change or the output of the equipment (products change in appearance causing a color change), and if there is such a change, a recognized event is then identified and a response is initiated. Another non-limiting illustration, one or more image captured apparatus takes color images of a container, such as a waste disposal container or a store shelf, and transmits the color captured images to the control unit. The analysis software monitors the color captured images by examining the pixels of the each color captured image and determines if there is a change in the pixels' values (or a change in the average color pixel value) between a first color captured image and a previous time acquired color captured image, such as for example if there a store shelf containing products becomes empty with products thereby producing a color change, if there is such a change a recognized event is identified and a response is initiated. For another non-limiting illustration, one or more image capture apparatus takes color images of a surface (such as for a non-limiting example, a floor, carpet, table, driveway, sidewalk), and transmits the color captured images to the control unit. The analysis software monitors the color captured images by examining the pixels of the each color captured image and determines if there is a change in the color pixels' values between a first color captured image and a previous time acquired color captured image or if the average pixels value between the first color captured image and a previous later time acquired color captured image changes (such as for a non-limiting example if there is water, snow, ice, product pill, or newly placed objects or substance on the surface), that produces a color change, if there is such a change, a recognized event is identified and a response is initiated. Preferably, the selected workflow is based on the degree or the color change (the amount of color change, such as the change in the RGB values) to select the proper workflow. For a non-limiting example, if a surface, such as a sidewalk shows a color change indicating that snow has accumulated on the sidewalk, the degree of color change may indicate that the sidewalk is entirely covered and the snow needs to be removed or the degree of color change may indicate that the sidewalk is only partially covered with snow and snow removal is not required.

After a recognized event 124 has been identified and a workflow 126 and concern level 158 are determined, the response software 118 determines if an individual is or is not required to perform the workflow 126. If the response software 118 determines that the workflow 126 can be performed without the need of an individual, the response software 118 interacts with a robotic or an automatic control system 174, such as for a machine or a robotic system, to perform the workflow. If the response software 118 determines that an individual or individuals are needed to perform the workflow 126, the response software 118 uses a listing of qualified individuals 160 and identifies one or more individuals that are qualified for performing the workflow (qualified individuals 16) and sends the workflow 126 (the task to be performed) and the concern level 158 to the input/output devices 130 of the identified one or more qualified individuals 16. It should be understood that the identified qualified individuals will perform workflows in accordance with the concern level of the workflow. For an illustrated example, workflows having higher concern level will be performed before workflows having lower concern levels.

Figure 12:
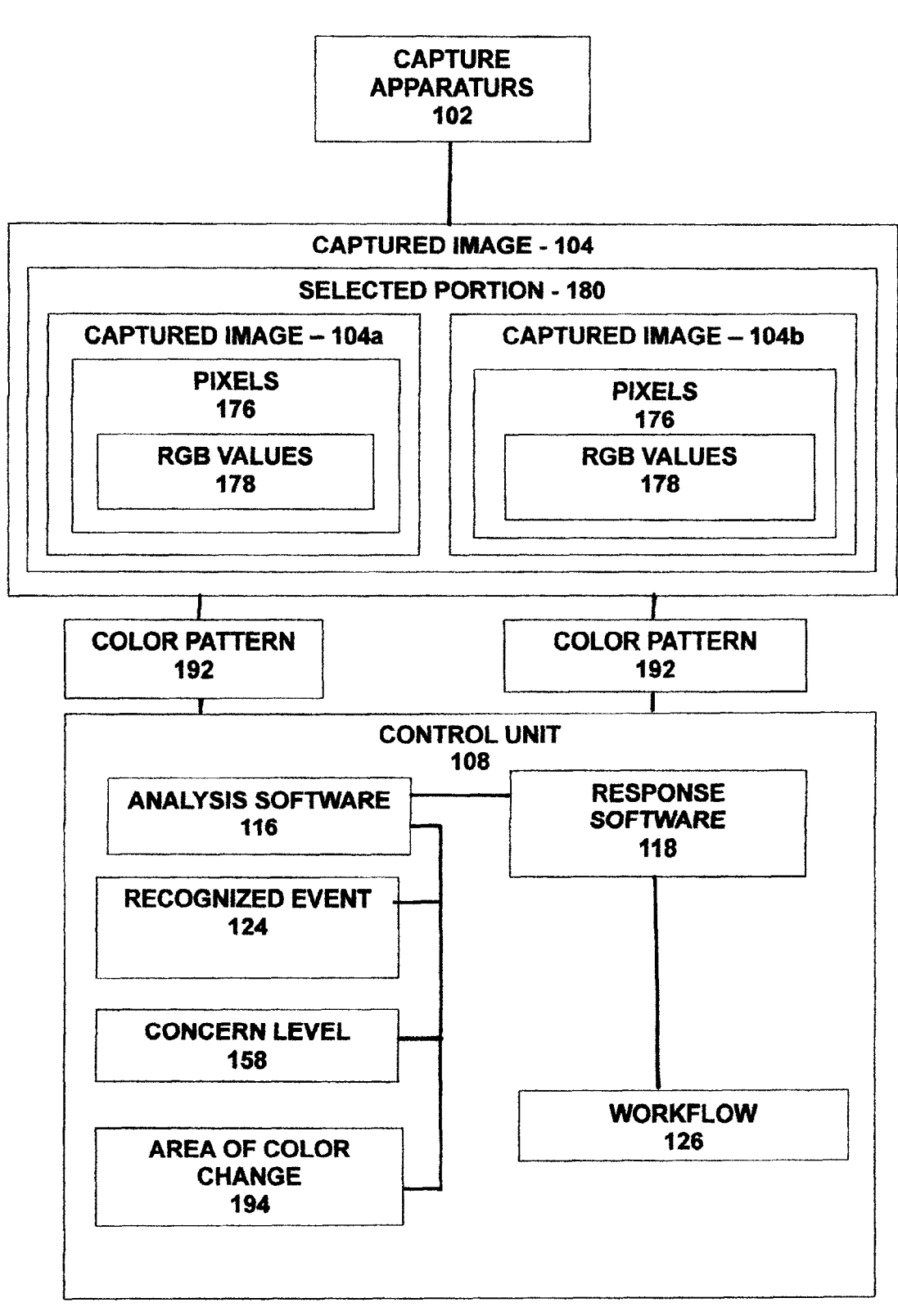
FIG. 12 is a schematic illustration showing the analysis software determining differences in color patterns between a first color collected image and a second color collected image and using the change in color patterns to identify a recognized event and a concern level and the response software identifying a workflow to respond to the recognized event.

In a preferred embodiment, as illustrated in FIG. 12, the analysis software 116 utilizes a color captured image 104 by examining the pixels 176 creating the image 104 and the pixels RGB values (color values) 178 of the color captured color image 104. The analysis software 116 analyzes the pixels 176 and the pixels RGB values 178 of the color captured image 104, preferably, for a selected portion 180 of the color captured image 104 and detects any changes in the pixels RGB values 178 that occurred between a color captured image 104a and a previously color captured image 104b. The analysis software 116 further identifies changes in color patterns 192 between the color captured image 104a and the previously color captured image 104b. Such image color pattern variation identification systems are known in the art and are often used to identify changes in color patterns in organisms, such as the NI Vision Development Module developed by National Instrument Corp. (Emerson Electric Co, of St. Lois, Missouri). The analysis software 116 uses the changes in pixels RGB values and changes in color patterns between the color captured image 104a and the previously color captured image 104b to identify a registered event 124. The analysis software 116 then compares the recognized event 124 with a list of recognized events 156 (baseline color changes). The analysis software 116 then communicates with the response software 118 to initiate a response (workflow) 126 based on the recognized event 124.

In another preferred embodiment, the analysis software 116 examines the color pixels 176 and the pixels RGB values 178 creating each color captured images and detects any changes in the color pixels 176 and the pixels RGB values 178 occurring between a color captured image 104a and a previous color captured image 104b and calculates the surface area 194 where the changes in color occurs. It should also be understood, that in addition to color the system can also analyze color saturation, hue and brightness changes to further identify a recognized event and determine a workflow and concern level for the recognized event.

As described above, in a preferred embodiment of the invention, the system for managing workflows for observed events comprises a control unit having analysis software and response software, one or more image capture apparatus that captures color images at a location and transmits the color captured images to the control unit, a list of or recognized events and a list or workflows for each recognized event in the list of recognized events, wherein the analysis software monitors the color captured images and examines the pixels and compares pixels between a color captured image and a previous color captured image and determines if there is a change between the pixels in the color captured image and the previous color captured image (the pixels in the color captured image are different than the pixels in the previous (an image taken at an earlier time) color captured image), and if there is a change, the analysis software uses a list of recognized events to identify a recognized event and communicates with the response software that uses a listing of workflows to determine a workflow for the identified recognized event. In a preferred embodiment, the analysis software determines if the average RGB value of the pixels creating the color captured image has changed from the average RGB value of the previous color captured image and uses the change in the average RGB values to identify a recognized event from a list of recognized events and communicates with the response software that uses a listing of workflows to determine a workflow for the identified recognized event. In another preferred embodiment, the analysis software identifies changes in color patterns between a color captured image and the previously color captured image. The analysis software uses the changes in pixels RGB values and changes in color patterns between the color captured image and the previously color captured image to identify a registered event. The analysis software then compares the recognized event with a list of recognized events (baseline color pattern changes). The analysis software then communicates with the response software to initiate a response (workflow) based on the recognized event. In another preferred embodiment, the response software further uses the time period between images and the changes in color between images to identify a recognized event and/or to determine a concern level for the identified event.

Preferably, the system further operates such that a concern level is determined for the identified registered event. After a recognized event has been identified and a workflow and concern level are determined, the response software determines if an individual is or is not required to perform the workflow. As previously described, if the response software determines that the workflow can be performed without the need of an individual, the response software interacts with a robotic or an automatic control system to perform the workflow. If the response software determines that an individual or individuals are needed to perform the workflow, the response software identifies one or more individuals that are input/output devices of the identified one or more qualified individuals. The qualified individual(s) perform workflows in the order of the concern level, the higher the concern level the greater the urgency in performing the workflow.

As illustrated in FIG. 13, the method for managing workflows for observed events comprises the steps of: taking color images of an object and transmitting the color captured images to a control unit (step 200); monitoring the color captured images to determine if there is a change in color from a color captured image and a previous color captured image using changes in the pixels and their RGB values between the color captured image and the previous color captured image (step 202); if there is a color change between said color captured image and the previous color captured image, identifying a recognized event and a concern value for the recognized event (step 204); selecting a workflow for the recognized event (step 206); determining if an individual is needed to perform the workflow and if it is determined that an individual is needed to perform the workflow, selecting one or more qualified individuals who are qualified to perform the workflow and transmitting the workflow and the concern level to individuals input/output device of each selected one or more qualified individuals (step 208), and wherein if it is determined that an individual is not needed to perform the workflow, interacting with one or more automated control systems controlling robotic or automatic equipment or machines to perform the workflow (step 210); and if is determined that an individual is needed to perform the workflow, and wherein if one or more qualified individuals are performing other workflows having concern levels, the one or more qualified individuals perform the workflows in order of their concern levels (step 212). In a preferred embodiment, the method further comprises the steps of determining changes in color patterns between a first color captured image and a second color captured image (step 214) and using the changes in color pattern to identify a recognized event (step 216) and/or using a time period between the first color captured image and the second color captive image showing a color change and using the time period to identify a recognized event and/or a concern level for the recognized event.

In a preferred embodiment the method includes the steps of determining if an individual is needed to perform the workflow (step 218) and if it is determined that an individual is needed to perform the workflow; selecting one or more qualified individuals who are qualified to perform the workflow (step 220) and transmitting the workflow and the concern level to individuals input/output device of each selected one or more qualified individuals (step 222), and wherein if it is determined that an individual is not needed to perform the workflow, interacting with one or more automated control systems controlling robotic or automatic equipment or machines to perform the workflow (step 224); and if is determined that an individual is needed to perform the workflow, and wherein if one or more qualified individuals are performing other workflows having concern levels, the one or more qualified individuals perform the workflows in order of their concern levels (step 226).

Figure 14:
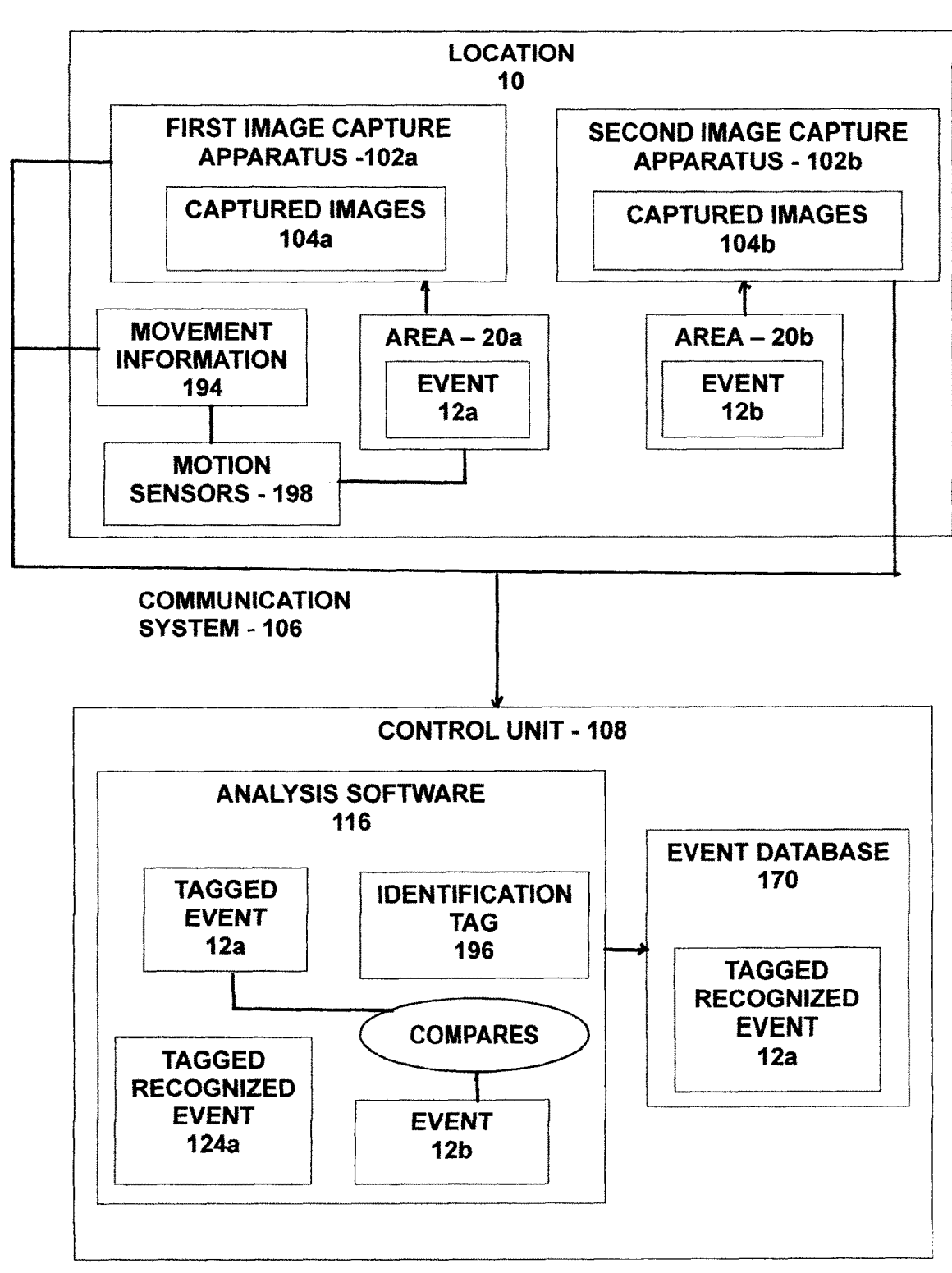
FIG. 14 is a schematic illustration showing a first image capture apparatus capturing a sequence of images showing an event and the analysis software identifying the event as a recognized event, and a second image capture apparatus capturing at least one image and the analysis software identifying an event as a recognized event, and the analysis software calculating movement information using the sequence of captured images captured by the first image capture analysis to calculate movement information of the recognized event to determine if the recognized event captured in the sequence of captured images is the same recognized event identified in the at least one captured image captured by the second image capture apparatus.

In view of the foregoing, the subject invention provides a systems and methods whereby images of an object can be analyzed and changes on color or a color pattern of the object can be detected and analyzed and specific responses (workflows) can be selected for responding to the particular change in the color or the color pattern of the object. Further, a concern level can be determined for the particular color change or color pattern change. Thus, unlike previously designed systems that simply detect a color change (no particular color change) and a response for a color change in general, the system and method of the subject invention allows for a specific response (workflow) to be selected for a specific color change or color pattern change. The system and method further provide that an administrator can define selected portions of captured images and define workflows and concern levels for color or color pattern changes. For example, a color or color pattern changes are used to define or identify events within a defined portion of captured images and depending on the recognized event, a workflow can be selected for responding to the recognized event, such as, but not limited to sending out alerts, identifying qualified individual(s) to respond to the recognized event and communicating with the qualified individua(s) and providing the workflow and concern level for responding to the recognized event, or communicating with control systems (such as a control system for a robotic system, equipment or machinery) that then directs the robotic system, equipment or machinery to respond to the recognized event. Thus, the subject invention detects color or color pattern changes shown in live video streams or sequence of images to identify events, unlike prior art systems that simply detect a color. It should also be understood, that in addition to color the system can also analyze color saturation, hue and brightness changes to further identify a recognized event and determine a workflow and concern level for the recognized event. Further, the system can also determine the area (size, such as the for example, the square inch area where there is a color or color pattern change and/or the time period by which the color or color pattern took place, to determine a recognized event, workflow and concern level. For a non-limiting example, if the color change occurred over a relatively short time period, the concern level may be higher than a color change having occurred over a relatively long time period. For a non-limiting illustration, if a color change or color pattern change on a machine surface occurred over a relatively long time period, the workflow could simply be slowing down the operation of a machine or cooling the temperature in the area of the machine, whereas if the color change or color pattern change occurred over a relatively short time period, the workflow could be shutting down the machine or that a part, such as a bearing, must be replaced immediately to prevent additional damage to the machine. Identifying a Recognized Event as it Moves Through a Location Referring to FIG. 14, in another embodiment of the invention is a system and method for managing workflow for an observed event as the event is tracked as it moves through a location is shown. As illustrated, the system 100 includes two or more image capture apparatus 102 strategically placed to capture images (captured images 104) within the location 10. As further illustrated, a first image capture apparatus 102a captures one or more images (captured images) 104a of an area 20a of a location 10 and transmits the captured images 104a to a control unit 108 using the communication system 106. The control unit 108 has analysis software 116 that continuously monitors the captured images 104a captured by the first image capture apparatus 102a to detect events 12. If an event 12 is detected, the analysis software 116 then calculates movement information 194 of the event 12 using the captured images 104a captured by said first image capture apparatus 102a and assigns an identification tag 196 to the event (tagged event 12a). The tagged event 12a and the identification tag 196 are then saved in event database 170. Preferably, the analysis software 116 then determines, as described above, if the observed tagged event 12a is a recognized event 124. If the observed tagged event 12a is a recognized event 124, it is stored in the event database 170 as a recognized event 124 together with the assigned identification tag 196. Once the event 12a has been detected and tagged, the analysis software 116 uses movement information 194 obtained of the event 12a to acquire or calculate the speed and direction of movement of the tagged event 12a. It should be understood that movement information 194 preferably includes data that permits the direction of movement and speed of movement of the detected tagged event 12a (or tagged recognized event 124) to be directly obtained by the analysis software 116 or can be used to calculate the speed and direction of movement of the tagged event 12a. Such movement information 194 can be obtained using various known techniques and systems, such as by use of various motion sensors 198 positioned within the location 10 that together detect movement and translates the movement into data that is transmitted to the control unit 108 and analyzed and interpreted by the analysis software 116 to obtain or calculate various aspects of the detected tagged event's movement 12a (or tagged recognized event 124a), such as speed and direction of movement of the tagged event 12a (or tagged recognized event 124). In the preferred embodiment, the system 100 includes a second image capture apparatus 102b that captures one or more images (captured images 104b) of another area 20 of the location 10 and transmits the captured images 104b to the control unit 108. The analysis software 116 continuously monitors the captured images 104b captured by the second image capture apparatus 102b to detect an event 12b. If an event is detected, the analysis software 116 uses the movement information 194 of the tagged event 12a identified in the captured images 104a captured by the first image capture apparatus 102a to determine if the tagged event 12a (or tagged recognized event 124) detected in the captured images 104a captured by the first image capture apparatus 102a is the same event 12b (or recognized event 124) detected in the captured images 104b taken by said second capture apparatus 102b. If the analysis software 116 determines that the tagged event 12a (or tagged recognized event 124) detected in the captured images 104a captured by the first image capture apparatus 102a is the same event 12b (or recognized event 124) detected in the captured images 104b captured by the second image capture apparatus 102b, the event 12b (or tagged recognized event 124) detected in the captured images 104b captured by the second image capture apparatus 102b is assigned the same identification tag 196 as the tagged event 12a (or tagged recognized event 124a) detected in the captured images captured by the first image capture apparatus 102a. If the analysis software 116 determines that the tagged event 12a (or tagged recognized event 124) detected in the captured images 104a captured by the first image capture apparatus 102*a* is not the same event 12*b* (or recognized event 124) detected in the captured images 104*b* captured by the second image capture apparatus 102*b*, the event 12*b* (or recognized event 124) detected in the captured images 104*b* captured by the second image capture apparatus 102*b* is assigned a different or new identification tag 196. It should now be apparent that the preferred embodiment of the system permits the tracking of an event (or recognized event) as it moves though a location and comes into and out of view by various image capture apparatus and to identify that the event (or recognized event) as being the same event (or same recognized event) as in goes out of view by one image capture apparatus and comes into view by another image capture apparatus. It should also now be understood that an event (or recognized event) can be tracked as it moves through a location without the need of a tracking device attached to the event (such as an object). It should also be understood that an event, whether it is a recognized event or not, can be tracked as it moves through a location.

In a non-limiting illustrative example, if an event, such as an individual walking down a corridor (area) in a location, a first image capture apparatus operates to capture images of the individual which are transmitted, such as by the communications system, to the control unit. The analysis software, using movement information transmitted to the control unit uses the movement information to determine a time which the individual (event) should appear in captured images captured by another (a second) image capture apparatus, such as an image capture apparatus farther down the corridor or an image capture apparatus capturing images at an intersection (another area) of that corridor and another corridor. By using the movement information, the analysis software determines that the individual (event) is the same individual (event) in the images captured by the first image capture apparatus as the individual (event) in the images captured by the another (second) image capture apparatus. For example, using the movement information the analysis software can calculate the time that the individual (event) should appear in the images captured by the second image capture apparatus, and if an individual (event) appears in the images captured by the second image capture apparatus within the calculated time, it is likely the same individual and should be assigned the same identification tag as the individual (event) that appeared in the captured images captured by the first image capture apparatus. It should also be understood, that if the individual (event) is a recognized individual (recognized event), the certainty that the individual (recognized event) is the same individual (recognized event) increases. It should also now be apparent that the same process allows an event to be tracked as it moves throughout a location and comes into view of various image capture apparatus.

In another non-limiting illustrative example, if an event, such as an individual walking down a corridor (area) in a location, a first image capture apparatus operates to capture images of the individual which are transmitted, such as by the communications system, to the control unit. The analysis software, using attributes such as the size, shape, color, color patters to determine a time which the individual (event) should appear in captured images captured by another (a second) image capture apparatus, such as an image capture apparatus farther down the corridor or an image capture apparatus capturing images at an intersection (another area) of that corridor and another corridor. By using the movement information, the analysis software determines that the individual (event) is the same individual (event) in the images captured by the first image capture apparatus as the individual (event) in the images captured by the another (second) image capture apparatus.

In another preferred embodiment, for each detected tagged recognized event 124, the analysis software 116 determines if the tagged recognized event 124 is a recognized event requiring a workflow 126, as described above, and if the analysis software 116 determines that the tagged event 12 is a recognized event 124 requiring a workflow 126, the analysis event 116 cooperates with response software 118 to transmit the workflow 126 to a qualified individual 16 (as described above) to perform the workflow 126 or directs robotic or automatic equipment 174 to perform the workflow 126.

Figure 15:
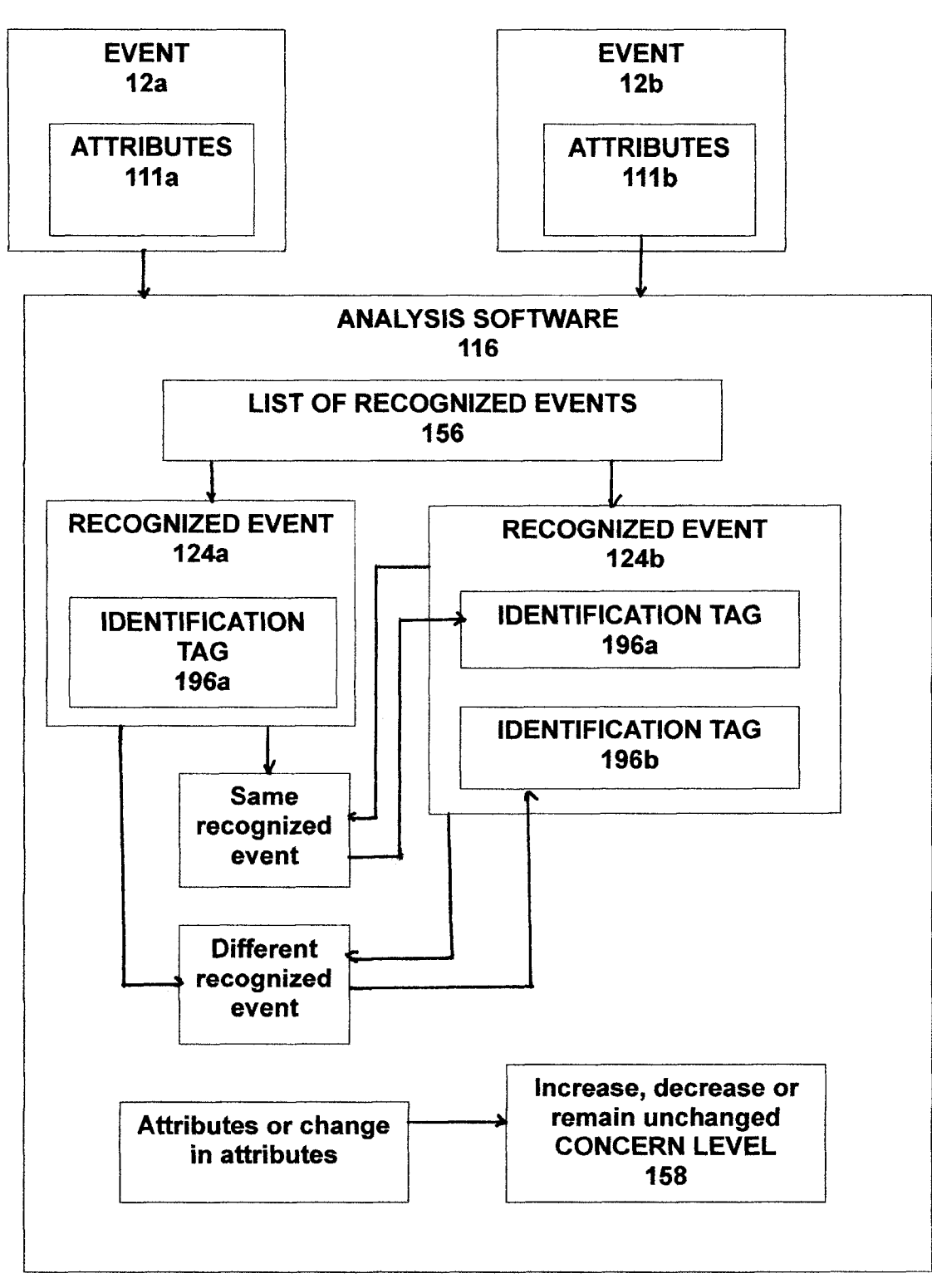
FIG. 15 is a schematic illustration showing a first recognized event having attributes and a second recognized event having attributes and analysis software using a comparison of attributes to determine if the first recognized event and the second recognized event are the same recognized event or are different recognized events and if the recognized events are the same, determining if the concern level for the recognized event should be increased or decreased based on the changes in the attributes.

In a preferred embodiment of the invention, if an event 12 is detected, as illustrated in FIG. 15, the analysis software 116 analyzes the captured images 104*a* to determine if the event 12 is a recognized event 124*a*, such as comparing the captured images 104*a* captured in a first image capture apparatus 102*a* to a list of recognized events 156 (such as by comparing the captured images 104*a* to reference images that identify a recognized event in the list of recognized events 156) as described above and assigns an identification tag 196*a* to the recognized event 124*a* and stores the recognized event 124*a* (such as by storing the one or more images used to detect the event) in the event database 170 in the memory 110 (or in a cloud). In a preferred embodiment, the analysis software uses a list of recognized events 156, each having a concern level 158, to assign a concern level 158 to the tagged recognized event 124*a*. Captured images 104*b* captured by a second image capture apparatus 102*b* are analyzed by the analysis software 116 to identify an event 12*b* and uses the list of recognized events 156 to determine if the event 12*b* is a recognized event 124*b* and if the recognized event 124*b* is not the same recognized event 124*a* it assigns a new identification tag 196*b* to the recognized event 124*b*. If the recognized event 124*b* is the same recognized event 124*a* it assigns the same identification tag 196*a* to the recognized event 124*b*. In a preferred embodiment, the analysis software 116 uses various attributes 111*a* of the recognized event 124*a* and the various attributes 111*b* of the recognized event 124*b*, such as color, color patterns, size, shape, temperature patterns, motion, direction of movement, speed of movement, dwell time, time duration, time periods, number of times a recognized event is detected, and other attributes, to determine if the recognized events 124*a* and 124*b* are the same or different recognized events. In another preferred embodiment, the analysis software 116 determines differences (changes) in the attributes 111*a* and 111*b* to adjust the concern level 158 of the recognized event. For a non-limiting illustrative example, if the color or color pattern of the recognized event changes, the analysis software can increase or decrease the concern level for the recognized event. In another non-limiting illustrative example, the direction of movement of recognized event can be used by the analysis software to increase or decrease the concern level, such as if the recognized event is moving closer or away from a hazardous area.

In order to better illustrate a preferred embodiment of the invention, the system includes a first image capture apparatus strategically positioned within a location and takes images (captured images) of an area. The images are transmitted to a control unit using a communication system. The control unit has analysis software that continuously monitors the transmitted captured images and if an event is detected, the analysis software associates an identification tag to the detected event and stores the captured image showing the event together with the assigned identification tag in an event data database. In a preferred embodiment, the analysis software determines if the event is a recognized event. If the event is not a recognized event, the analysis software performs the operations as described above and transmits a notice and one or more of the captured images to an administrator that can add the event to a list of recognized events making the event a recognized event. Other operations, as described above, such as assigning a concern level and a workflow can also be performed. Using various sensors, movement information is transmitted to the control unit using the communication system which is used by the analysis software in determining the movement of the event. The system includes one or more other image capture apparatus that capture images of other areas within the location. Using movement information, the analysis software calculates or determines when the event that was detected is expected to be captured by one or more of the other image captured apparatus (an expected time period) and identifies the one or more image capture apparatus that is expected to capture images showing the event. If an identified image capture apparatus captures an image showing an event within the time period as calculated or determined by the analysis software and the image capture apparatus is an identified image capture apparatus, the analysis software concludes that it is the same event and assigns the event shown in the captured images captured by the identified image capture apparatus the same identification tag as the event. If an event is shown in captured images by an image captured apparatus that is not an identified image capture apparatus or the captured images was captured outside the time period, the analysis software assigns the event a different (new) identification tag. Preferably, the analysis software determines if the event detected in the captured images captured by an identified image capture apparatus is a recognized event which is used by the analysis software in determining if the events taken by the various image capture apparatus are the same events. The analysis software cooperating with response software further assigns a concern level to the recognized event and a workflow and if a workflow is needed, the analysis software and response software further cooperate to implement a response as described above.

Another non-limiting illustration, a first image captured apparatus captures one or more images, preferably color images, and transmits the captured images to the control unit. The analysis software continuously monitors the captured images to detect an event. When an event has been detected, the analysis software determines if the event is a recognized event, such as by using various attributes of the event, such as by using the size, shape, color, and color patterns of the event as described above. The analysis software, continues to monitor images captured by other image captured apparatus to detect an event and as described above determines if the event is a recognized event. The analysis software using attributes, such as the size, shape, color, and color patterns determines that the event is a recognized event and if the recognized event is the same recognized event detected in previous images captured by an image capture apparatus. The analysis software further uses changes in the attributes to determine if the recognized event has changed. For example, if the recognized event detected in images captured by a first image capture apparatus is an individual carrying luggage, such as through an airport, and the same recognized event captured in images captured by a second image capture apparatus has changes in the attributes that the analysis software determines that the individual no longer is carrying luggage, such as by using AI software, the concern value may be increased and the analysis software cooperating with response software can assign and transmit a workflow to the input/output devices of qualified individuals directing one or more qualified individuals to investigate or monitor the individual or directs other systems, such as conventional security systems to perform a workflow.

It should also now be understood that an event can be in the form of a condition, such as fire, smoke, water, gas and the like. For an illustrated example, the event detected in a capture image captured by a first image captured apparatus may be identified as a recognized event. Movement information (such as direction of movement of smoke, water, fire and the like) of such a recognized event can be calculated or determined and used as described above to identify other image capture apparatus that is expected to capture images showing such event. In this way, the analysis software can calculate or determine the speed that the event is moving (as well as the size of the event-area it covers) and a concern level and workflow can be assigned and a proper response can be implemented.

A preferred embodiment of the system for tracking an event as the event moves through a location comprises a first image capture apparatus that captures one or more images at a location and transmits the captured images to a control unit, wherein the control unit has analysis software that monitors the captured images captured by the first capture apparatus to detect an event, if an event is detected, the analysis software then calculates movement information of the event captured by the first image apparatus and assigns an identification tag to the event (tagged event); a second image capture apparatus that captures one or more images at a location and transmits the captured images to the control unit, wherein the analysis software monitors the captured images captured by the second image capture apparatus to detect an event, if an event is detected, the analysis software uses the movement information to determine if the tagged event detected in the captured images captured by the first image capture apparatus is the same event detected in the captured images taken by the second capture apparatus. If the analysis software determines that the tagged event detected in the captured images captured by the first image capture apparatus is the same event detected in the captured images captured by the second image capture apparatus, the event detected in the captured images captured by the second image capture apparatus is assigned the same identification tag as the tagged event detected in the captured images captured by the first image capture apparatus. If the analysis software determines that the tagged event detected in the captured images captured by the first image capture apparatus is not the same event detected in the captured images captured by the second image capture apparatus, the event detected in the captured images captured by the second image capture apparatus is assigned a different identification tag. For each detected tagged event, the analysis software determines if the tagged event is a recognized event requiring a workflow and if the analysis software determines that a tagged event is a recognized event requiring a workflow, the analysis event cooperates with response software to select a workflow and transmit the workflow to a qualified individual to perform the workflow or directs robotic or automatic equipment to perform the workflow.

In a preferred embodiment, the analysis software uses movement information of the tagged event in determining if the tagged event is a recognized event that requires a workflow.

In a preferred embodiment, the analysis software determines a concern level for the recognized event.

In a preferred embodiment, the captured images are color images.

In a preferred embodiment, the captured images are color images and the analysis software determines if there is a color change in the tagged event as it moves through the location and if the analysis software determines that there is a color change, the analysis software uses the color change in determining if the tagged event is a recognized event and if the tagged event is a recognized event, the analysis software assigns a concern level for the recognized event and uses the concern level in determining if the recognized event requires a workflow.

In a preferred embodiment, the captured images captured by the first image capture apparatus and the captured images captured by the second image capture apparatus are color images. If the tagged event detected in the captured images captured by the first image capture apparatus is the same tagged event detected in the captured images captured by the second image capture apparatus, the analysis software then compares the captured images captured by the first image capture apparatus of the tagged event and the captured images captured by the second image capture apparatus of the tagged event to determine if there is a color change in the tagged event as it moves through the location. If the analysis software determines that there is a color change, the analysis software uses the color change in determining a concern value and a workflow for responding to the color change.

In a preferred embodiment, if the analysis software determines that the tagged event requires a workflow, the analysis software communicates with response software to determine if an individual is needed to perform the workflow. If it is determined that an individual is needed to perform the workflow, the response software selects one or more qualified individuals who are qualified to perform the workflow and transmits the workflow to an individuals input/output device of each selected one or more qualified individuals. If the response software determines that an individual is not needed to perform the workflow, the response software interacts with one or more automated control systems controlling robotic or automatic equipment or machines to perform the workflow.

In a preferred embodiment if the response software determines if an individual is needed to perform the workflow, the response software transmits the concern level to the individuals input/output device and if the one or more qualified individuals are performing other workflows having concern levels, the one or more qualified individuals perform the workflows in order of the concern levels.

In a preferred embodiment, the captured images are color images, and if the analysis software determines that the event detected in the captured images captured by the first image capture apparats and the event detected in the captured images captured by the second image capture apparatus are the same event, the analysis software examines and compares color pixels and RGB values (color values) creating a portion of a captured image showing the event detected in the captured image captured by the first image capture apparatus to a portion of a captured image showing the event detected in the capture image captured by the second image capture apparatus and uses the comparison to detect any changes in the pixels and RGB values and uses the detected changes in determining if a workflow is required for responding to the event.

In a preferred embodiment, the captured images are colored images, and the analysis software examines color pixels and RGB values (color values) and calculates an average RGB value creating the event detected in the captured images captured by the first image capture apparatus and examines color pixels and RGB values (color values) and calculates an average RGB value creating the event detected in the captured images captured by the second image capture apparatus and uses the average RGB values to detect any changes in the average RGB values to determine if there is a change in color between the event detected in the captured images and said analysis software uses the change in color in determining if an event detected is a recognized event.

In a preferred embodiment, if the event is a recognized event, the analysis software compares the change in said average RGB values with RGB reference thresholds for the recognized event and if the change in the average RGB values are below RGB reference thresholds. The analysis software continues to monitor the captured images, and if the change in average RGB values is equal to or above the RGB reference thresholds, the analysis software determines a concern value and directs the response software to determine a workflow for responding to the recognized event.

In a preferred embodiment, the workflow is further selected based on degree or color change (the amount of color change, such as the change in the RGB values).

In a preferred embodiment, the captured images are color images and if the analysis software determines that the event detected in the captured images captured by the first image apparatus and the event detected in the captured images captured by the second image capture apparatus are the same event, the analysis software identifies changes in color patterns between the event detected in the captured images captured by the first image capture apparatus and the event detected in the captured image captured by the second image capture apparatus and uses the change in the color patterns to determine if the event is a recognized event.

In a preferred embodiment, if the recognized event detected in the captured images captured by the first image capture apparatus and the recognized event detected in the captured images captured by the second image capture apparatus are the same recognized event, the analysis software determines a time period between the captured images captured by the first image capture apparatus showing the recognized event and the captured images captured by the second image capture apparatus showing the recognized event. The analysis software then uses the time period in determining the concern level.

In a preferred embodiment, the recognized event is selected from a list of recognized events that correspond to a color change.

In a preferred embodiment, the analysis software determines a color change in the recognized event and calculates a surface area where changes in color occurs and uses the surface area in determining a concern level.

A preferred embodiment of the invention is a system for tracking an event as the event moves through a location comprising: a first image capture apparatus that captures one or more images at the location and transmits the one or more captured images to a control unit. The control unit has analysis software that monitors the captured images captured by the first image capture apparatus to detect an event having attributes and uses the attributes to determine if the event is a recognized event. If the event is a recognized event, the analysis software assigns an identification tag to the recognized event and a concern level for the recognized event. A second image capture apparatus captures one or more images at the location and transmits the one or more captured images to the control unit. The analysis software monitors the captured images captured by the first image capture apparatus to detect an event having attributes and uses the attributes to determine if the event is a recognized event. The analysis software determines if the recognized event detected in the captured images captured by the first image capture apparatus is the same recognized event detected in the captured images captured by the second image capture apparatus and if the recognized events are the same recognized event, the analysis software assigns the same identification tag to the recognized event detected in the captured images captured by the second image capture apparatus. The analysis software compares the attributes of the events to determine if the concern level should be increased or decreased and assigns the same or an increased or decreased concern level to the recognized event detected in the captured images captured by the second image capture apparatus. The analysis software cooperates with response software to determine if the same recognized event requires a workflow, and if the same recognized event requires a workflow, the analysis software cooperates with response software to select a workflow and transmits the workflow to a qualified individual to perform the workflow or directs robotic or automated equipment to perform the workflow.

In a preferred embodiment, if the workflow is to be performed by a qualified individual, the qualified individuals performs workflows based on the concern level of the recognized event.

It should now be apparent to one skilled in the art that a preferred embodiment of the invention permits objects (events) to be tracked across several image capture apparatus, such as by using a hybrid of cloud and edge computing, such as for example, if a machine, environmental condition, object or person moves around a location (such as a facility or an outdoor space) and the location is a vey large location covered by multiple image capture apparatus. Thus, the same event visible in one image capture apparatus can be tracked using other image capture apparatus as it moves to other areas at the location. Further, if an event (or a recognized event) is determined to be similar to a previous event (or a recognized event), the analysis software can determine the probability that the event (or a recognized event) is the same event (or recognized event), such as within a threshold probability, and the entire history (movement and changes in attributes) can be recorded and used for future analysis.

Although the foregoing invention has been described in some detail for purposes of clarity of understandings, it will be apparent that certain changes and modifications may be practiced within the scope of the appended claims. Accordingly, it should also now be apparent that the various embodiments presented can be easily modified while keeping within the scope and spirit of the subject invention. It should also be understood that the present disclosure is to be considered as exemplary of the principals of the invention and is not intended to limit the invention to the embodiments and the specific examples illustrated and the invention is not to be limited to the details given herein, but may be modified within the scope and equivalents of the descriptions and examples contained herein.

The invention claimed is:

1. A system for tracking an event as the event moves through a location comprising:

a first image capture apparatus that captures one or more images at the location and transmits said captured images to a control unit, wherein said control unit has analysis software that monitors said captured images captured by said first capture apparatus to detect an event, if an event is detected, said analysis software then assigns an identification tag to said detected event (first tagged event);

a second image capture apparatus that captures one or more images at a location and transmits said captured images to said control unit, wherein said analysis software monitors said captured images captured by said second image capture apparatus to detect an event, if an event is detected, said analysis software uses attributes of said capture images captured by said first image capture apparatus and said capture images captured by said second image capture apparatus to determine if said first tagged event detected in said captured images captured by said first image capture apparatus is the same event detected in said captured images captured by said second capture apparatus, wherein if said analysis software determines that said first tagged event detected in said captured images captured by said first image capture apparatus is the same said event detected in said captured images captured by said second image capture apparatus, said event detected in said captured images captured by said second image capture apparatus is assigned the same identification tag (first tagged event) as the tagged event detected in said captured images captured by said first image capture apparatus, wherein if said analysis software determines that said tagged event detected in said captured images captured by said first image capture apparatus is not the same said event detected in said captured images captured by said second image capture apparatus, said event detected in said captured images captured by said second image capture apparatus is assigned a different identification tag (second tagged event); and wherein for each detected tagged event, said analysis software determines if each said detected tagged event is a recognized event requiring a workflow and if said analysis software determines that a said detected tagged event is a recognized event, said recognized event is given a concern level and a required workflow, said analysis software then cooperates with response software to select a workflow and transmit said workflow to a qualified individual to perform said workflow or directs robotic or automatic equipment to perform said workflow;

wherein said analysis software determines changes in said attributes of a said recognized event and uses said changes to increase or decrease said concern level for said recognized event; and wherein if said workflow is performed by said qualified individual, said qualified individual performs workflows based on the order of said concern level of workflows to be performed by said qualified individual.

2. The system for tracking an event as it moves through a location of claim 1, wherein said attributes are movement information and said analysis software uses said movement information of a said tagged event in determining if a said tagged event is a recognized event that requires a workflow.

3. The system of claim 2, wherein said recognized event is selected from a list of recognized events that correspond to a color change.

4. The system of claim 2, wherein said analysis software determine a color change in said recognized event and calculates surface area where changes in color occurs and uses said surface area in determining a concern level.

5. The system for tracking an event as it moves through a location of claim 1, wherein said analysis software identifies a concern level and workflows from a listing of recognized events and concern levels.

6. The system for tracking an event as it moves through a location of claim 1, wherein said captured images are color images.

7. The system for tracking an event as it moves through a location of claim 1, wherein said captured images are color images and wherein said analysis software determines if there is a color change in a said tagged event as it moves through the location and if said analysis software determines that there is a color change, said analysis software uses said color change in determining if said tagged event is a recognized event and if said tagged event is a recognized event, said analysis software assigns said concern level for said recognized event based on said color change and uses said concern level in determining if said recognized event requires a workflow.

8. The system for tracking an event as it moves through a location of claim 1, wherein said captured images captured by said first image capture apparatus and said captured images captured by said second image capture apparatus are color images and wherein if said tagged event detected in said captured images captured by said first image capture apparatus is the same said event detected in said captured images captured by said second image capture apparatus, said analysis software then compares said captured images captured by said first image capture apparatus of said tagged event and said captured images captured by said second image capture apparatus of said event to determine if there is a color change as it moves through the location and if said analysis software determines that there is a color change, said analysis software uses said color change in determining said concern value and said workflow.

9. The system for tracking movement of an event through a location of claim 1, wherein if said recognized event is in the form of a sequence of events and a first event has been detected and a second event has been detected in said sequence of events and said second event occurred after said first event, and in said sequence said second event was to occur prior to said first event, said analysis software identifies said concern level and said workflow from a listing of workflows and if an individual is needed to perform said workflow, said qualified individuals are selected from a listing of qualified individuals to perform said workflow.

10. The system for tracking events moving through a location of claim 1, wherein said captured images are color images, and wherein if said analysis software determines that said event detected in said captured images captured by said first image capture apparatus and said event detected in said captured images captured by said second image capture apparatus are the same event, said analysis software examines and compares color pixels and RGB values (color values) creating a portion of a captured image showing said event detected in said captured image captured by said first image capture apparatus to a portion of a captured image showing said event detected in said capture image captured by said second image capture apparatus and uses said comparison to detect any changes in said pixels and RGB values and uses said detected changes in determining if a workflow is required for responding to said event.

11. The system of tracking movement of an event traveling through a location of claim 1, wherein said captured images are colored images, and wherein said analysis software examines color pixels and RGB values (color values) and calculates an average RGB value creating said event detected in said captured images captured by said first image capture apparatus and examines color pixels and RGB values (color values) and calculates an average RGB value creating said event detected in said captured images captured by said second image capture apparatus and uses said average RGB values to detect any changes in said average RGB values to determine if there is a change in color between said captured images and said analysis software uses any said change in color in determining if an event detected is a recognized event.

12. The system of tracking movement of an event traveling through a location of claim 11, wherein if said event is a recognized event, said analysis software compares said change in said average RGB values with RGB reference thresholds for said recognized event and if said change in said average RGB values are below said RGB reference thresholds, wherein said analysis software continues to monitor said captured images, and wherein if said change in said average RGB values is equal to or above said RGB reference thresholds, said analysis software determines a concern value and directs said response software to determine a workflow for responding to said recognized event.

13. The system of claim 12, wherein said workflow is further selected based on degree or color change in the RGB values.

14. The system of claim 1, wherein said captured images are color images and if said analysis software determines that said event detected in said captured images captured by said first image apparatus and said event detected in said captured images captured by said second image capture apparatus are the same event, said analysis software identifies changes in color patterns between said event detected in said captured images captured by said first image capture apparatus and said event detected in said captured image captured by said second image capture apparatus and uses said change in said color patterns to determine if said event is a recognized event and uses said change in said color patterns to determine a concern level for said recognized event.

15. The system of claim 1, wherein if said recognized event detected in said capture images captured by said first image capture apparatus and said recognized event detected in said captured images captured by said second image capture apparatus are the same recognized event, said analysis software determines a time period between said captured images captured by said first image capture apparatus showing said recognized event and said captured images captured by said second image capture apparatus showing said recognized event, and wherein said analysis software uses said time period in determining a concern level.

16. The system of claim 1, wherein said analysis software uses attributes of said event detected in said captured images captured by said first image capture apparatus and said attributes of said event detected in said captured images captured by said second image capture apparatus to determine if said events are the same event and if said events are the same event, uses changes in said attributes to determine a concern level for said event.

17. A system for tracking an event as the event moves through a location comprising:

a first image capture apparatus that captures one or more images at the location and transmits said one or more captured images to a control unit, wherein said control unit has analysis software that monitors said captured images captured by said first image capture apparatus to detect an event having attributes and uses said attributes to determine if said event is a recognized event, wherein if said event is a recognized event said analysis software assigns an identification tag to said recognized event and a concern level for said recognized event;

a second image capture apparatus that captures one or more images at a location and transmits said one or more captured images to said control unit, wherein said analysis software monitors said captured images captured by said second image capture apparatus to detect an event having attributes and uses said attributes to determine if said event is a recognized event;

wherein said analysis software determines if said recognized event detected in said captured images captured by said first image capture apparatus is the same recognized event detected in said captured images captured by said second image capture apparatus and, if said recognized events are the same recognized event, said analysis software assigns the same said identification tag to said recognized event detected in said captured images captured by said second image capture apparatus;

wherein if said recognized event detected in said captured images captured by said first image capture apparatus is the same said recognized event detected in said captured images captured by said second image capture apparatus, said analysis software then compares said captured images captured by said first image capture apparatus of said tagged event and said captured images captured by said second image capture apparatus of said event to determine if there is a change in attributes between said recognized event detected in said captured images captured by said first image capture apparatus and said recognized event detected in said captured images captured by said second capture apparatus and if said analysis software determines that there is a change is said attributes, said analysis software cooperates with response software to use said change in attributes in determining a concern value and a workflow for responding to said change in said attributes and transmits said concern level and workflow to one or more qualified individuals to perform said workflow or directs robotic or automated equipment to perform said workflow.

18. A system for tracking an event as the event moves through a location comprising:

a first image capture apparatus that captures one or more images at the location and transmits said one or more captured images to a control unit, wherein said control unit has analysis software that monitors said captured images captured by said first image capture apparatus to detect an event having attributes and uses said attributes to determine if said event is a recognized event, wherein if said event is a recognized event said analysis software assigns an identification tag and a concern level to said recognized event;

a second image capture apparatus that captures one or more images at the location and transmits said one or more captured images to said control unit, wherein said analysis software monitors said captured images captured by said second image capture apparatus to detect an event having attributes and uses said attributes to determine if said event is a recognized event;

wherein said analysis software determines if said recognized event detected in said captured images captured by said first image capture apparatus is the same recognized event detected in said captured images captured by said second image capture apparatus and, if said recognized events are the same recognized event, said analysis software assigns the same said identification tag to said recognized event detected in said captured images captured by said second image capture apparatus;

wherein said analysis software compares the attributes of said recognized event to determine if said concern level should be increased or decreased and assigns the same or an increased or decreased concern level to said recognized event detected on said captured images captured by said second image capture apparatus; and wherein said analysis software determines if said recognized event requires a workflow, and if said recognized event requires a workflow, said analysis software cooperates with response software to select a workflow and transmits said workflow to a qualified individual to perform said workflow or directs robotic or automated equipment to perform said workflow.

\* \* \* \* \*